United States Patent
Lee et al.

(10) Patent No.: US 9,363,351 B2
(45) Date of Patent: Jun. 7, 2016

(54) TERMINAL AND METHOD FOR CONTROLLING THE SAME

(71) Applicant: LG ELECTRONICS INC., Seoul (KR)

(72) Inventors: Kunwoo Lee, Seoul (KR); Jin Kim, Seoul (KR); Jihoon Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/295,737

(22) Filed: Jun. 4, 2014

(65) Prior Publication Data

US 2014/0364170 A1    Dec. 11, 2014

(30) Foreign Application Priority Data

Jun. 5, 2013    (KR) .......................... 10-2013-0064754

(51) Int. Cl.
*H04M 1/725*    (2006.01)

(52) U.S. Cl.
CPC ...... *H04M 1/72522* (2013.01); *H04M 1/72547* (2013.01); *H04M 2250/74* (2013.01)

(58) Field of Classification Search
CPC ..................... H04M 1/72522; H04M 1/72547; H04M 2250/74
USPC ........... 380/255; 709/204, 246, 206; 345/758; 704/235, 275; 715/728; 455/563
See application file for complete search history.

(56) References Cited

U.S. PATENT DOCUMENTS

| | | | |
|---|---|---|---|
| 8,326,343 B2 | 12/2012 | Lee | |
| 8,380,507 B2 | 2/2013 | Herman et al. | |
| 2003/0220972 A1* | 11/2003 | Montet et al. | ................. 709/204 |
| 2009/0048821 A1 | 2/2009 | Yam et al. | |
| 2011/0040846 A1* | 2/2011 | Weinryb et al. | ................ 709/206 |
| 2013/0044072 A1* | 2/2013 | Kobayashi | .......... H04M 1/0237 345/173 |
| 2013/0104172 A1* | 4/2013 | Lee | .................. G06F 17/30967 725/60 |
| 2013/0283168 A1* | 10/2013 | Brown et al. | ................. 715/728 |

* cited by examiner

*Primary Examiner* — Qun Shen
(74) *Attorney, Agent, or Firm* — Birch, Stewart, Kolasch & Birch, LLP

(57) ABSTRACT

The present disclosure may provide a mobile terminal including a virtual receiving unit, a display unit configured to display a graphic image receiving a control command for transmitting input data to the virtual receiving unit, a user input unit configured to be activated to receive the input data based on the control command, and a controller configured to control the virtual receiving unit to generate response data associated with the input data.

20 Claims, 21 Drawing Sheets

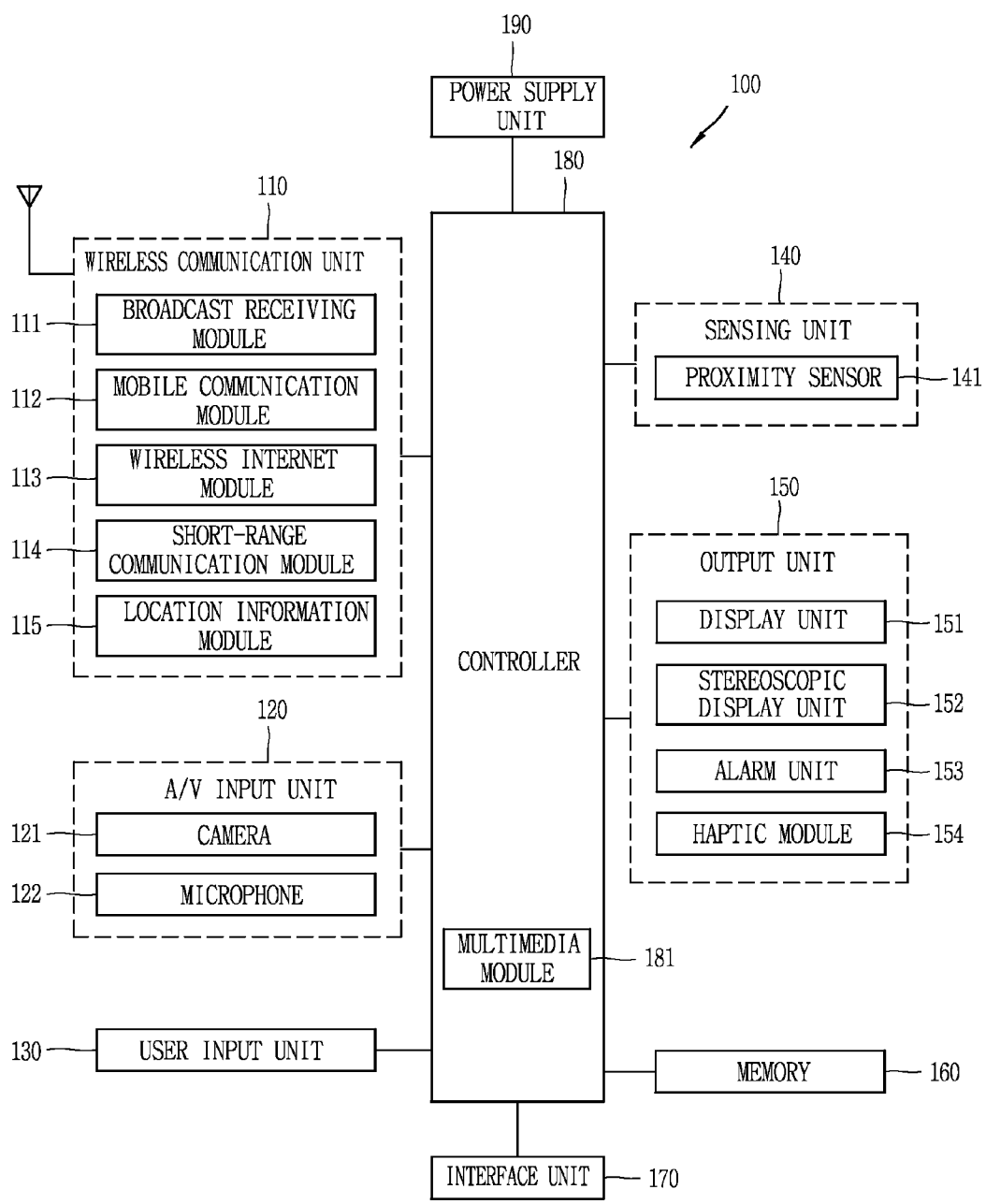

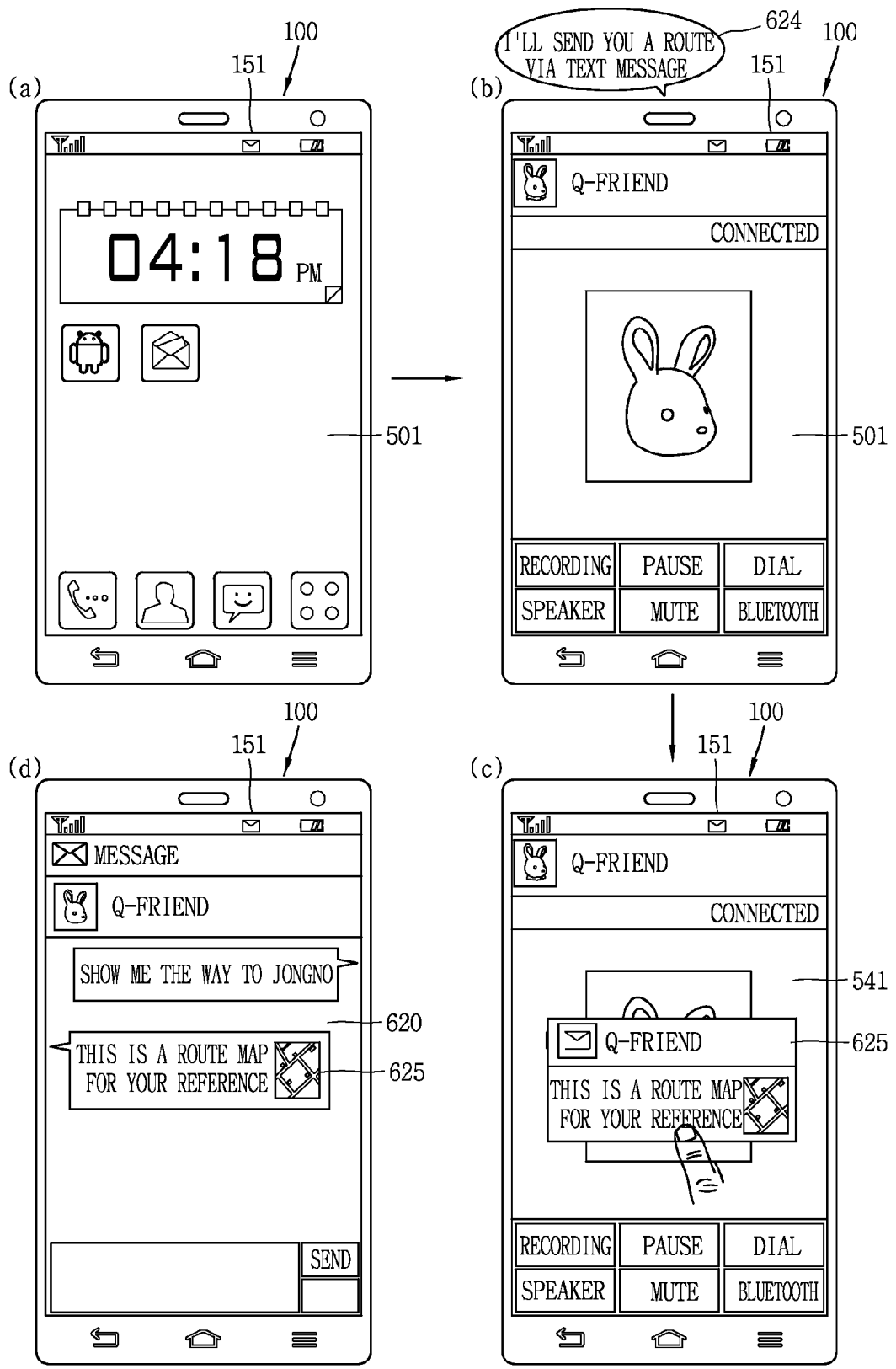

TERMINAL AND METHOD FOR CONTROLLING THE SAME

RELATED APPLICATION

Pursuant to 35 U.S.C. §119(a), this application claims the benefit of earlier filing date and right of priority to Korean Application No. 10-2013-0064754, filed in Republic of Korea on Jun. 5, 2013 the contents of which are incorporated by reference herein in it entirety.

BACKGROUND OF THE INVENTION

1. Field of the Invention

The present disclosure relates to a mobile terminal including a virtual receiving unit configured to display response data to input data.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As the function becomes diversified, the terminal is implemented in the form of a multimedia player having complicated functions such as capturing still or moving images, playing music or video files, gaming, receiving broadcast, and the like. Moreover, improvements in the structural and software elements of the terminal may be taken into consideration to support and enhance the function of the terminal.

In recent years, a mobile terminal may provide various services, and particularly, may include a search function for information having various categories. In other words, the mobile terminal may recognize data entered from a user to provide it with various forms.

However, in order to receive accurate information, the user should execute a specific program and provide input data suitable to the program, thereby causing inconvenience.

SUMMARY OF THE INVENTION

Accordingly, the task of the present disclosure is to provide response data corresponding to various forms of input data by a user using an application installed therein.

In order to accomplish the foregoing task of the present disclosure, a terminal according to an embodiment of the present disclosure may include a virtual receiving unit, a display unit configured to display a graphic image receiving a control command for transmitting input data to the virtual receiving unit, a user input unit configured to be activated to receive the input data based on the control command, and a controller configured to control the virtual receiving unit to generate response data associated with the input data.

As an example associated with the present disclosure, the mobile terminal may further include a memory configured to store at least one information associated with the virtual receiving unit, wherein the controller controls the display unit to display information on the virtual receiving unit along with information corresponding to at least one external terminal stored in the memory.

As an example associated with the present disclosure, the graphic image may be displayed along with the information of the virtual receiving unit, and the controller may control the display unit to display the execution screen of a message application performing the function of sending and receiving content based on the control command, and display the input data and the response data on the execution screen.

According to an example associated with the present disclosure, the mobile terminal may further include a memory including a storage space of the message application, and the controller may control the memory to store the input data and the response data in the storage space.

According to an example associated with the present disclosure, the controller may activate the message application when response data generated by a user's setting is output from the virtual receiving unit, and control the display unit to display an alarm screen notifying the reception of a message containing the response data.

According to an example associated with the present disclosure, the mobile terminal may further include a microphone configured to be activated by the control command to receive a user's voice and a speaker formed to output the response data as a voice signal.

According to an example associated with the present disclosure, the controller may activate a call application for transmitting and receiving a voice signal to and from the virtual receiving unit based on the control command.

According to an example associated with the present disclosure, the controller may activate the call application when response data is output from the virtual receiving unit based on the user's setting, and control the display unit to display screen information notifying the reception of the call.

According to an example associated with the present disclosure, the controller may control the display unit to display screen information notifying the reception of a call and the graphic image at the same time when the call is received from an external terminal, and the controller may activate a call mode for the call and transmits the response data to the external terminal based on the control command.

According to an example associated with the present disclosure, the mobile terminal may further include a memory configured to store information entered by the user, wherein the controller uses a voice signal received from the external terminal as input data in the call mode to generate the response data based on the information.

According to an example associated with the present disclosure, the controller may control the memory to store the input data and the response data, and the controller may control the display unit to display the stored input data and response data in a text format when the call mode is terminated.

According to an example associated with the present disclosure, the controller may further include an analysis unit configured to analyze a voice signal received from the external terminal in the call mode, and the controller may control the display unit to display information on the analyzed voice signal.

According to an example associated with the present disclosure, the controller may display the execution screen of a message application performing the function of sending and receiving content to and from an external terminal and the graphic image at the same time, and control the virtual receiving unit to receive the content as the input data based on the control command.

According to an example associated with the present disclosure, the controller may control the response data to be sent to the external terminal.

According to an example associated with the present disclosure, the controller controls the display unit to display an icon receiving a touch input for blocking the transmission of the response data.

According to an example associated with the present disclosure, the graphic image may be displayed based on a touch input applied to at least one content displayed on the display unit, and the controller may control the virtual receiving unit to receive the content as the input data based on the control command.

According to an example associated with the present disclosure, the controller may activate an application corresponding to the content based on the response data.

According to an example associated with the present disclosure, the mobile terminal may further include a memory configured to store information corresponding to the identification number of the mobile terminal for wireless communication with an external terminal, wherein the controller controls the information to be sent when the identification number is stored in the external terminal.

In order to accomplish the foregoing task of the present disclosure, a control method of a mobile terminal according to another embodiment of the present disclosure may include activating a user input unit for entering input data, generating response data regarding the input data, and activating an output unit for outputting the response data, wherein the output unit corresponds to at least one of a display unit for displaying visual data, a speaker for outputting a voice signal, and a wireless communication unit for transmitting the response data to an external terminal.

According to an example associated with the present disclosure, the method may further include displaying a graphic image receiving a control command for activating the user input unit on the display unit, wherein the graphic image is displayed along with the information of the external terminals stored by a user and the information of the virtual receiving unit receiving the input data.

According to the present disclosure, a user may use a message application for sending input data to the virtual receiving unit to receive information. Accordingly, the user may receive information in more convenient manner without being required to execute an additional application.

Furthermore, an application associated therewith may be automatically executed, and thus it is not required to have an additional entry control method for entering input data to the virtual receiving unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment disclosed in the present disclosure;

FIGS. 6A through 6F are conceptual views for explaining a control method of receiving response data according to various embodiments;

DETAILED DESCRIPTION OF THE INVENTION

Figure 2A:
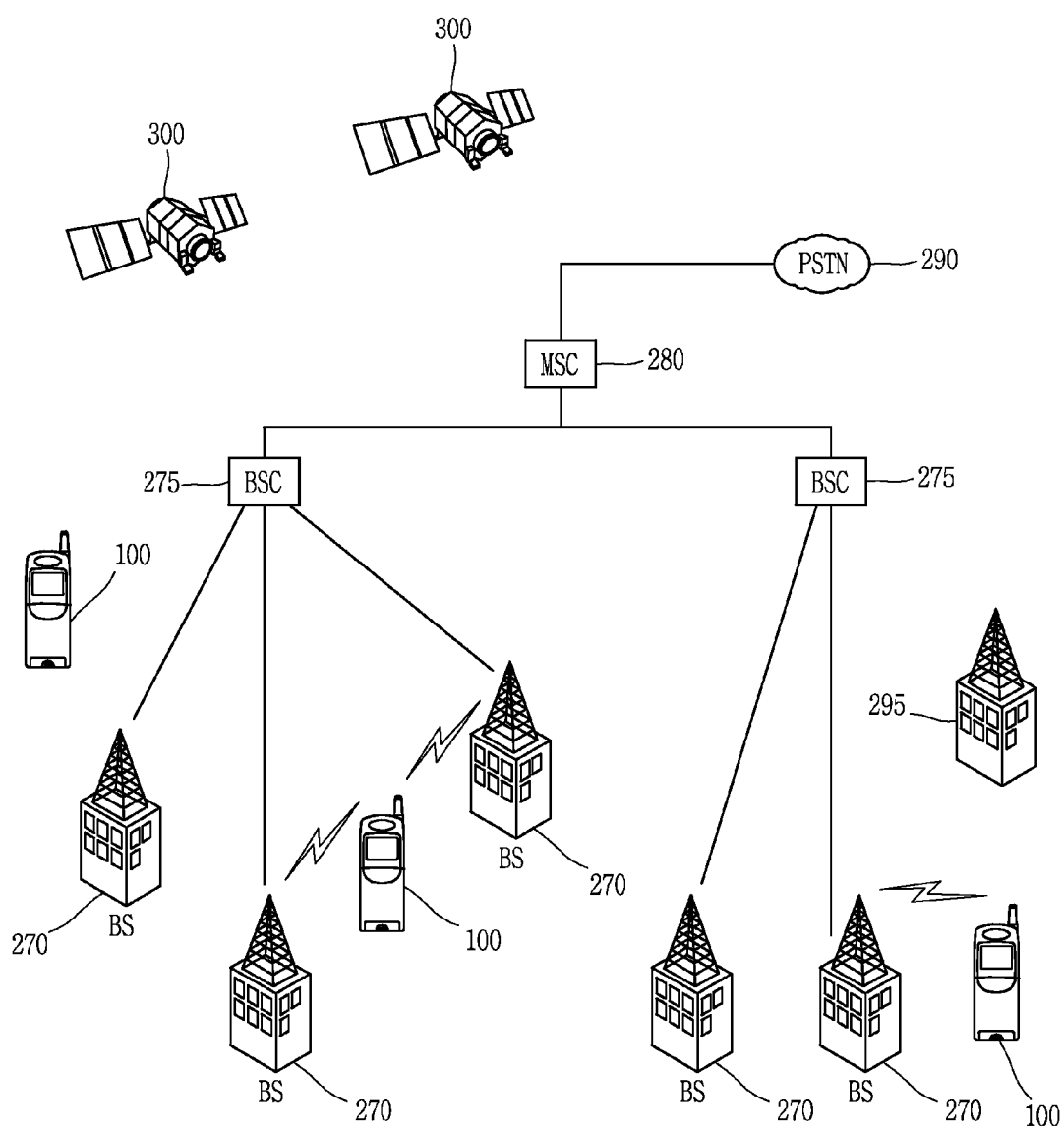
FIGS. 2A and 2B are conceptual views illustrating a communication system in which a terminal according to the present disclosure is operable.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

A terminal disclosed herein may include a portable phone, a smart phone, a laptop computer, a digital broadcast terminal, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile terminal 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (for example, proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Figure 2B:
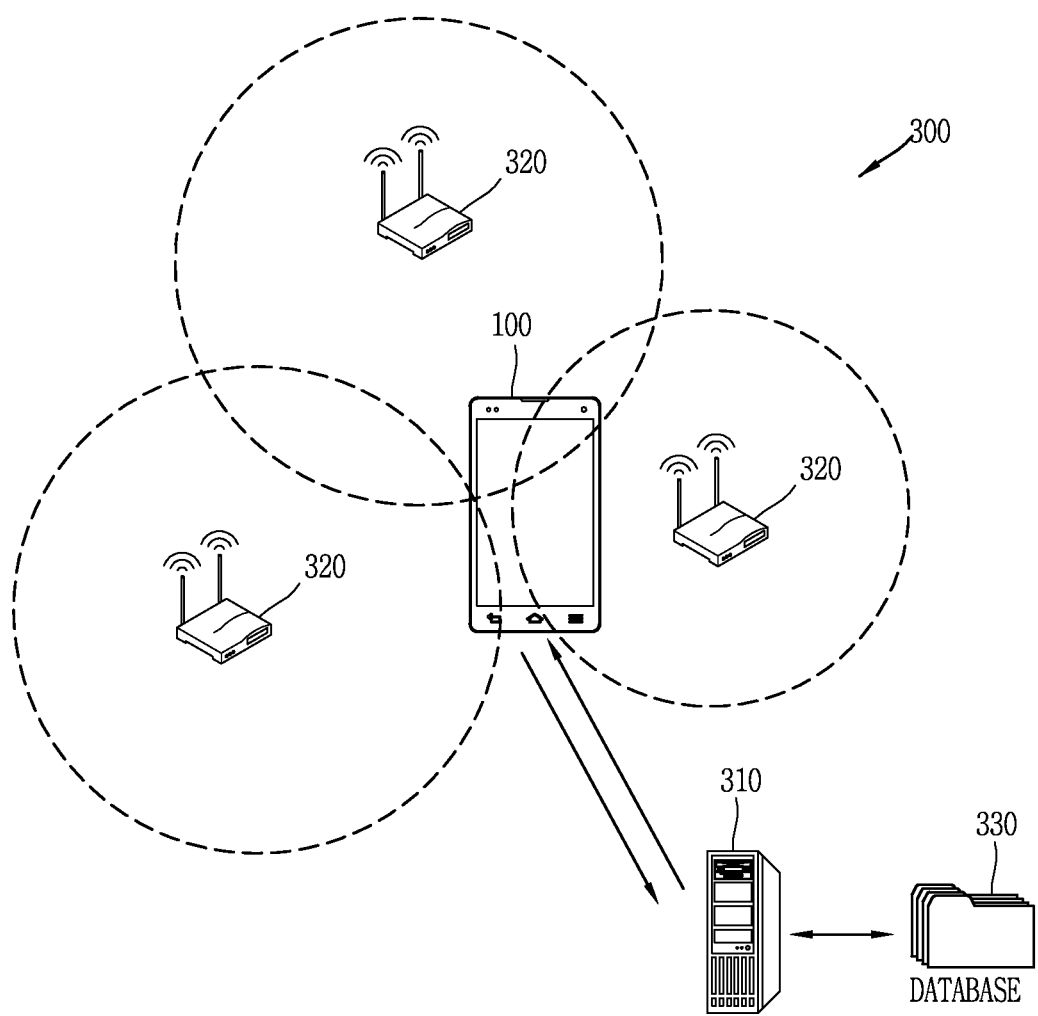

Next, a communication system that can be implemented through the mobile terminal 100 according to the present disclosure will be described. FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various terminals 100. At this time, he terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the terminals 100.

Next, a method of acquiring the location information of a terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3A:
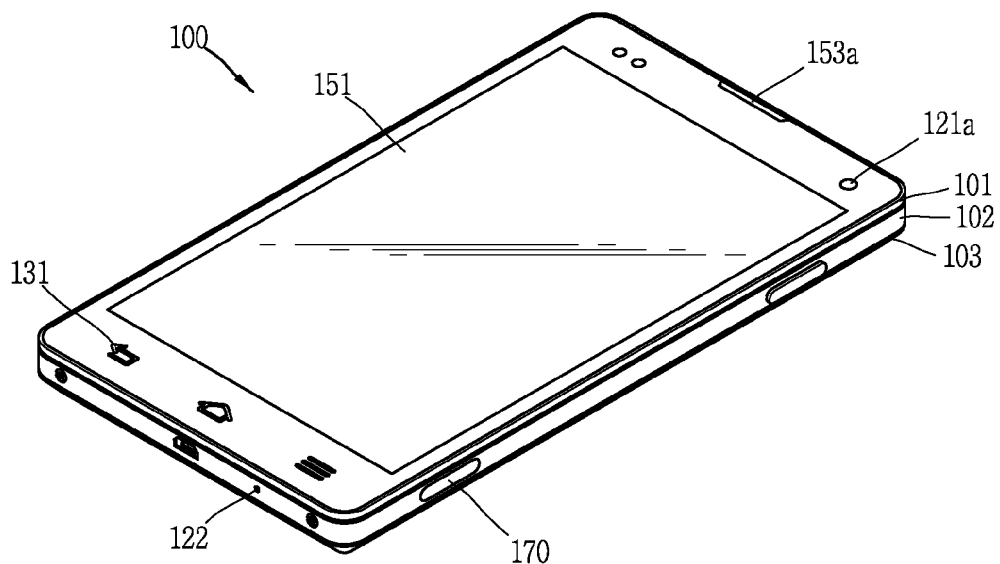
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being output from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
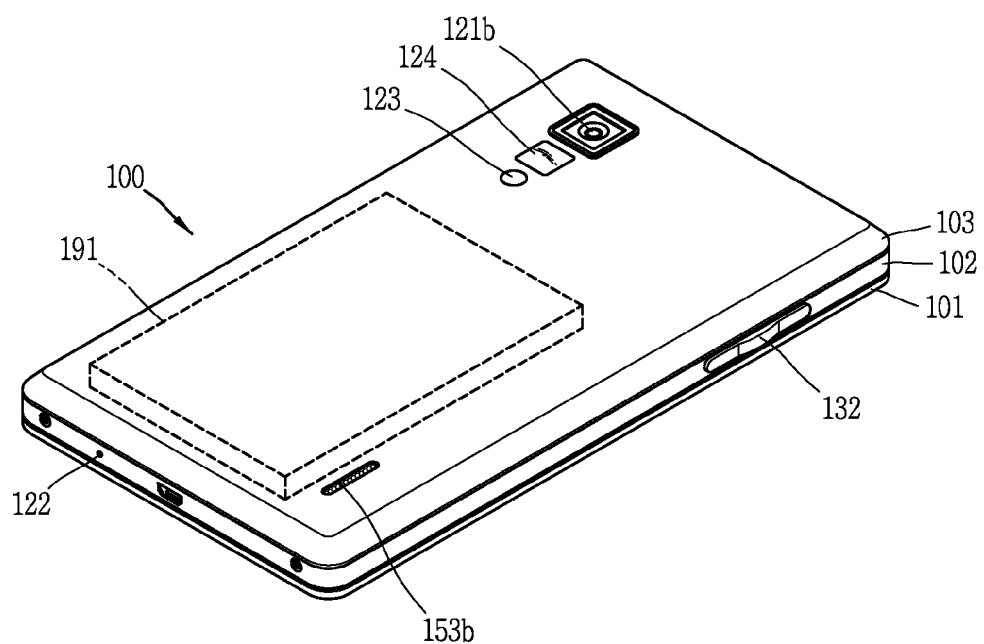
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Furthermore, the extracted location information of the mobile terminal 100 may be transmitted to the mobile terminal 100 through the WiFi location determination server 310, thereby allowing the mobile terminal 100 to acquire location information.

Figure 4:
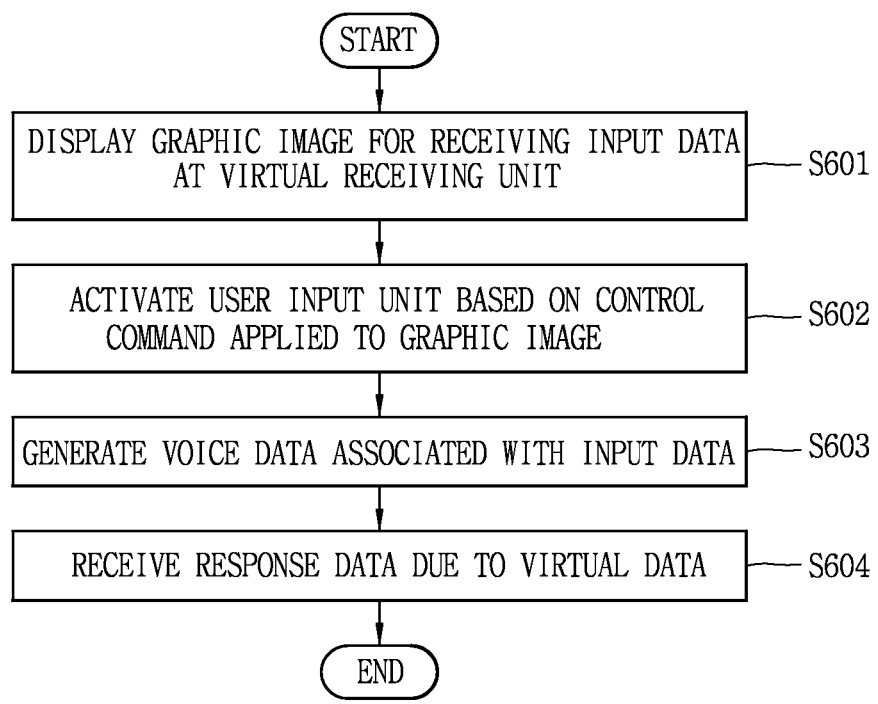
FIG. 4 is a flow chart for explaining a control method of a mobile terminal according to an embodiment of the present disclosure.
Figure 5A:
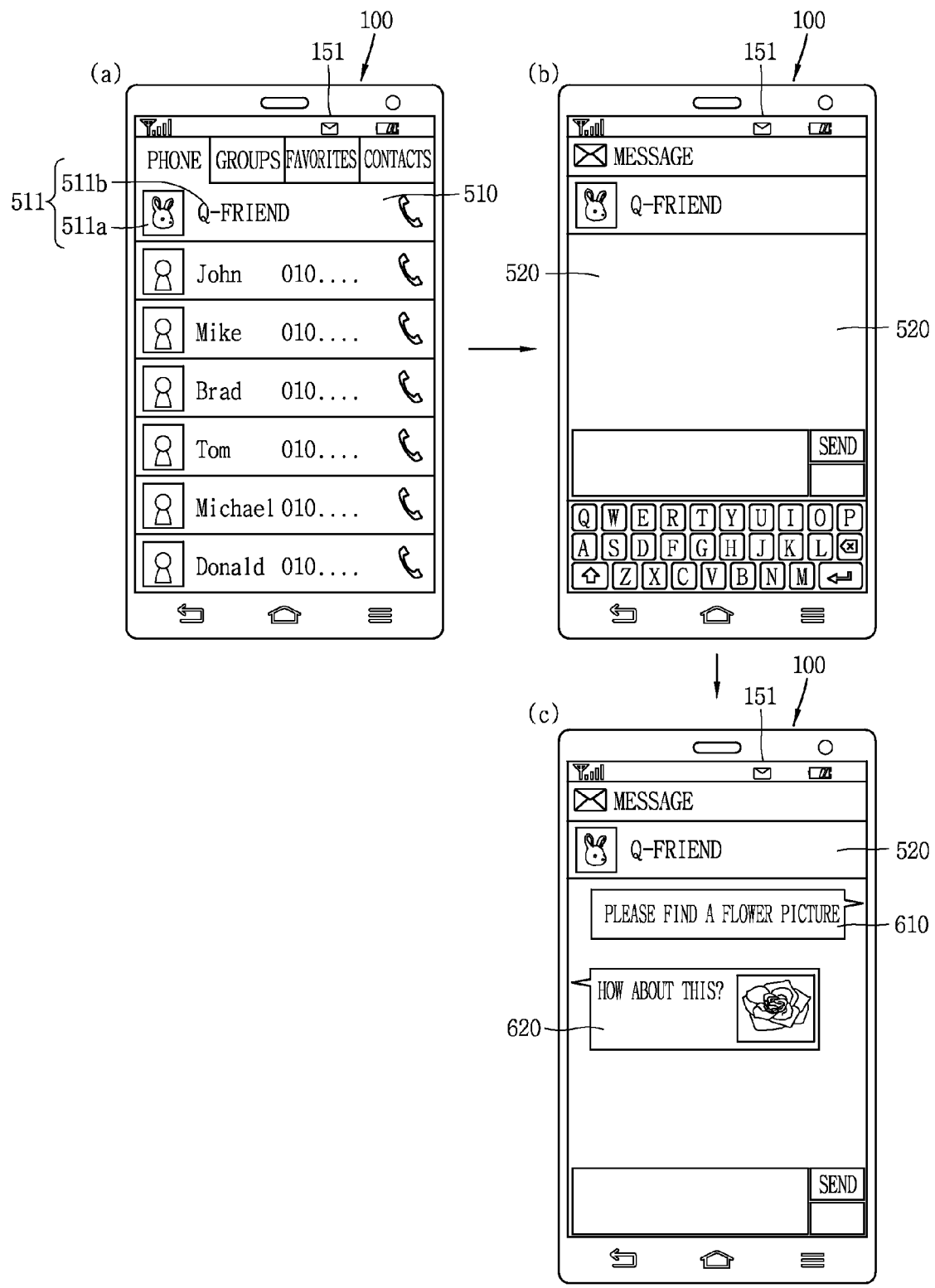
FIGS. 5A and 5B are conceptual views for explaining the control method of FIG. 4 according to an embodiment.
Figure 5B:
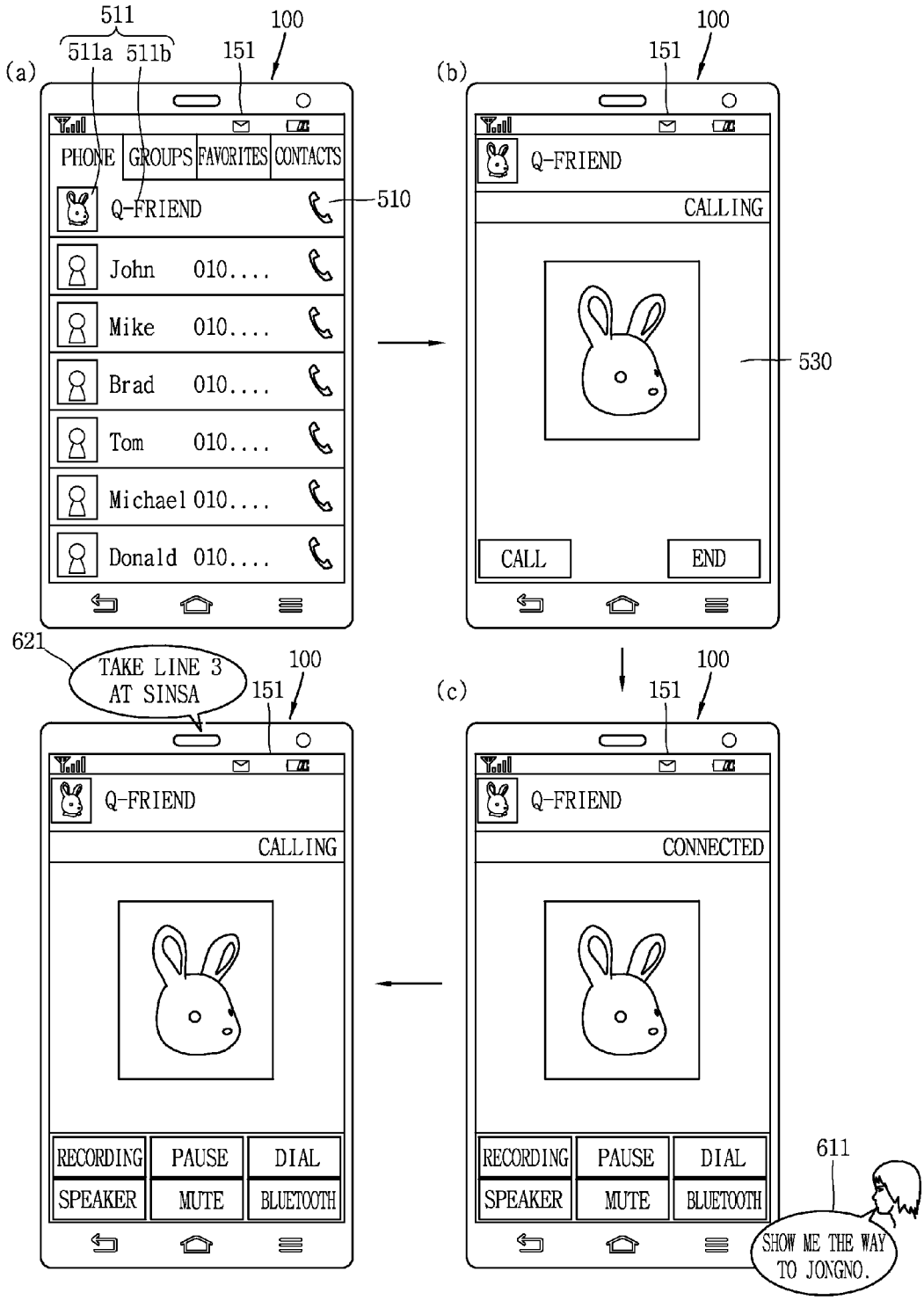

FIG. 4 is a flow chart for explaining a control method of a mobile terminal according to an embodiment of the present disclosure, and FIGS. 5A and 5B are conceptual views for explaining the control method of FIG. 4 according to an embodiment.

Referring to FIGS. 4 and 5A, the display unit 151 displays a graphic image for allowing a virtual receiving unit to receive input data (S601). FIG. 5A(a) illustrates the execution screen 510 of a contact application including the information of an external terminal stored in the memory 160.

The execution screen 510 may include a unique phone number for each external terminal, a representative name thereof, a representative image stored by the user, and the like. Furthermore, the execution screen 510 may include an icon for applying a touch input for connecting a call or sending a message to each unique phone number, and the like.

On the other hand, the execution screen of the contact (address) application may include information 511 on a virtual receiving unit. For example, the controller 180 may include a representative image 511a of the virtual receiving unit and a representative name 511b stored to correspond to the virtual receiving unit. The representative image 511a and representative name 511b may be stored in the memory 160 by the user, but may not be necessarily limited to this, and may also include a predetermined representative name (Q-FRIEND) and image that can be changed.

Here, the virtual receiving unit is formed to receive a control command in an internal terminal other than an external terminal, and perform a predetermined function based on the control command.

The information 511 may be formed with a graphic image for receiving a user's touch input or may include at least one graphic image. For example, the information 511 may include an icon for receiving a touch input to execute at least one application for making a call or sending a text message to the virtual receiving unit, and the like.

The controller 180 may control the display unit 151 to display more information of the virtual receiving unit based on a touch input applied to the information 511. Furthermore, the controller 180 may control the display unit 151 to display an edit screen capable of deleting and/or modifying information corresponding to the virtual receiving unit based on the touch input.

The controller 180 activates the user input unit 130 based on a touch input applied to the graphic image (S602). For example, referring to FIG. 5A(b), the controller 180 controls the display unit 151 to display the execution screen 520 of a message application for sending a message based on a touch input applied to the graphic image constituting or contained in the information 511. The execution screen 520 may include at least one input window for displaying information entered by a touch input or the like applied to the display unit 151.

Furthermore, the controller 180 controls the display unit 151 to display information on the virtual receiving unit and the like on the execution screen 520. In other words, the controller 180 may display the information of the virtual receiving unit to a recipient to whom information entered by the user is sent. For example, the controller 180 may control the display unit 151 to display a representative name and a representative image of the virtual receiving unit as the recipient of the message.

Referring to FIGS. 5A(b) and 5A(c), the controller 180 controls the display unit 151 to display input data 610 caused by the user's input applied to a virtual keyboard displayed on the display unit 151. Furthermore, the controller 180 transmits the input data 610 to the virtual receiving unit. For example, the controller 180 may control the memory 160 to store the input data 610 in the storage space of the virtual receiving unit.

The controller 180 generates response data 620 to the input data 610 (S603), and receives the response data 620. For example, the controller 180 controls the display unit 151 to display the generated response data 620 on the execution screen 520. Furthermore, the controller 180 may control the memory 160 to store the response data 620 in the storage space of the virtual receiving unit.

The controller 180 may control the display unit 151 to display the response data 620 in a received text message format on the execution screen 520.

The controller 180 may analyze the entered input data 610 to extract its meaning, and generate data associated with information contained in the input data 610 as the response data 620. Furthermore, the controller 180 may generate the response data 620 containing a conversation type sentence structure to correspond to the configuration of text contained in the input data 610.

For example, the input data 610 is configured with a sentence such as "Please find a flower picture", and the response data 620 analyzes phrases "a flower picture" and "Please find", respectively. Accordingly, the controller 180 may generate an image corresponding to the phrase "a flower picture" and a text such as "How about this?" corresponding to the phrase "Please find".

The controller 180 controls the display unit 151 to display the input data 610 and response data 620 in a substantially same layout as that displayed with a text message transmitted and received between the external terminal and the user.

Accordingly, the user may use a message application to send input data to the virtual receiving unit to receive information. As a result, the user may receive information without being required to execute an additional application.

Furthermore, a graphic image for connecting input data to the virtual receiving unit is displayed along with the execution screen of a contact application, and thus it is not required to have an additional entry control method for entering input data to the virtual receiving unit.

Furthermore, though not shown in the drawing, the input data and response data may include information on how to use a phone (built-in manual), a conversation using a natural language search such as counseling and advice, and the like.

A control method of receiving information using a phone application will be described with reference to FIG. 5B.

The controller 180 may apply a touch input to a graphic image of information on the virtual receiving unit contained in the execution screen 510 of the contact application to execute the call application.

In other words, the controller 180 executes a call application performing a call connection to the virtual receiving unit in a virtual manner by a touch input applied to the graphic image.

Furthermore, the controller 180 can activate the user input unit 130 along with the execution of the call application in actuality. In other words, the controller 180 may activate the microphone 122 to receive the user's voice in a call mode.

The controller 180 controls the display unit 151 to display an outgoing screen 530 of the call application based on a touch input applied to the graphic image. The outgoing screen 530 may include the information of the virtual receiving unit to notify that a call is being made to the virtual receiving unit. Furthermore, the controller 180 may control a ring back tone notifying that the call is being made to be output through the receiver.

The controller 180 may allow it to be switched to a connection to the virtual receiving unit, namely, a call mode, when a predetermined period of time (for example, several seconds) has passed or the activation of the user input unit is completed.

When the call mode is activated, the controller 180 may control the microphone 122 to receive a voice signal entered by the user. The controller 180 analyzes input data 611 received through the microphone 122 as a voice signal. Meanwhile, the controller 180 may control the memory 160 to stored the input data 611.

Referring to FIGS. 5B(c) and 5B(d), the controller 180 generates response data 621 caused by the input data 611. The format of the response data 621 may be formed in a substantially similar manner to that of the input data 611. In other words, the response data 621 corresponding to the input data 611 entered as the voice signal may be generated as a voice signal.

The controller 180 may control the receiver to output the response data 621 generated as the voice signal. For the response data 621, information contained in the input data 611 as well as speech pattern and the like may be analyzed to generate the response data 621.

Though not shown in the drawing, the call mode and call application may be terminated based on the user's control command for terminating the call. Furthermore, the controller 180 may control the memory to store the input data 611 and the response data 621. The memory can store the input and response data 611, 621 in various forms such as voice signal, text, and the like.

Accordingly, the user may not need to execute an additional application to receive response data, and may receive information with a similar feeling to that of making a call to an actual person using a call application.

FIGS. 6A through 6F are conceptual views for explaining a control method of receiving response data according to various embodiments.

Figure 6A:
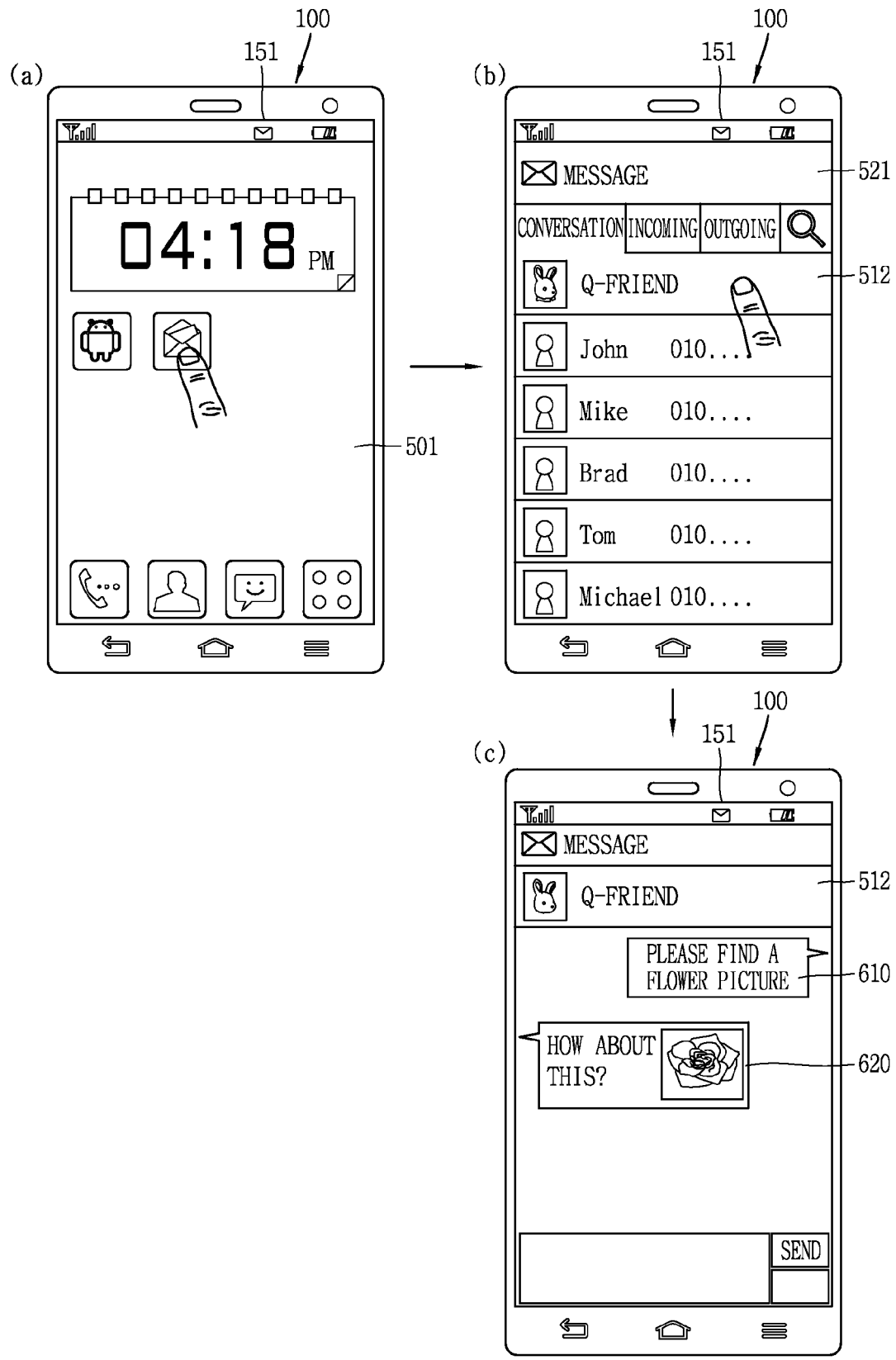

A control method of receiving data stored in a message application will be described with reference to FIG. 6A. FIG. 6A(a) illustrates a home screen including an icon receiving a touch input for executing a message application.

The controller 180 controls the display unit 151 to display the execution screen 521 of the message application based on a touch input applied to the icon. The execution screen 521 may include at least one message stored that has been sent to an external terminal or received from the external terminal.

The execution screen 521 may include the information of at least one external terminal that has transmitted and received a message by means of wireless communication. The controller 180 controls the display unit 151 to display a message or the like transmitted and received to and from the external terminal based on a touch input applied to the information of the external terminal.

The controller 180 controls the display unit 151 to display the information 512 of the virtual receiving unit along with the information of the external terminals on the execution screen 521.

Furthermore, the controller 180 controls the display unit 151 to display the information of the external terminals and the information of the virtual receiving unit in an arranged manner in a time sequence in which messages are received and sent.

Referring to FIGS. 6A(b) and 6A(c), the controller 180 may control the display unit 151 to display the input data 610 and the response data 620 based on a touch input applied to the information 512 of the virtual receiving unit on the execution screen 521. The input and response data 610, 620 may be displayed along with the execution screen 512 of the virtual receiving unit to notify the status of messages transmitted and received to and from the virtual receiving unit to the user. Furthermore, the input data 610 and the response data 620 may be preferably arranged in the entered and received time sequence.

Accordingly, the user can receive data transmitted to the virtual receiving unit and the resultant response data even after the passage of time.

Furthermore, though not shown in the drawing, the controller 180 may control the memory 160 to partially or entirely delete the input and response data 610, 620 based on a user's control command.

Furthermore, the controller 180 may control the memory 160 to automatically delete old input and response data 610, 620 based on a predetermined storage space of the message application.

Figure 6B:
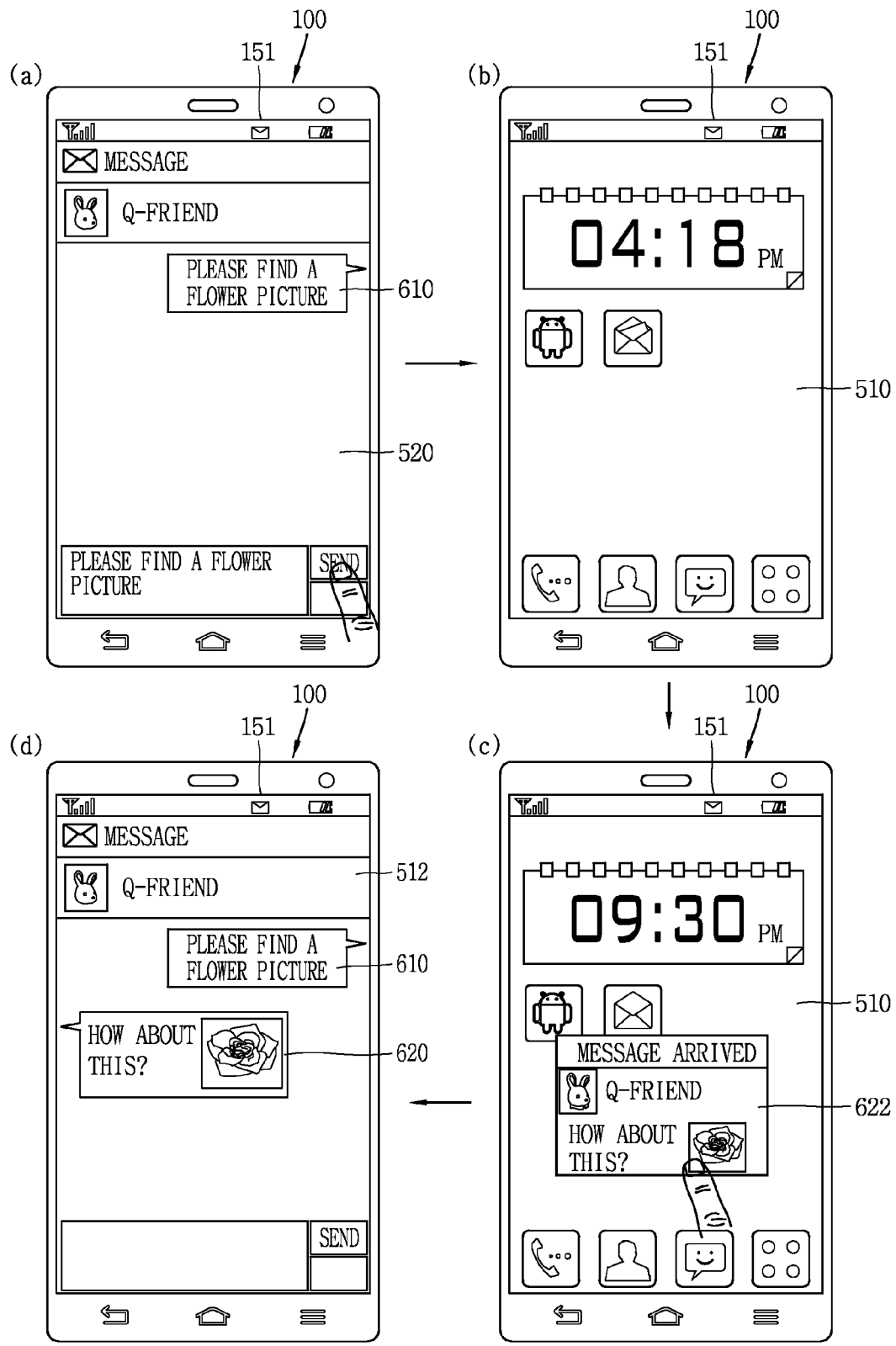

A method of receiving the response data 620 will be described with reference to FIG. 6B. Referring to FIG. 6B(a), the controller 180 controls the input data 610 to be sent to the virtual receiving unit based on a touch input applied to the execution screen 520 of the message application.

Referring to FIGS. 6B(b) and 6B(c), subsequent to transmitting the input data 610, the controller 180 may control the display unit 151 to switch the execution screen 520 to another screen information 510 based on a user's control command or an event occurred in the mobile terminal. For example, the screen information 510 may correspond to a home screen based on a control command applied to a home key of the mobile terminal.

When response data 620 associated with the input data 610 is generated, the controller 180 may control the display unit 151 to display a message receiving window 622 indicating that the response data 620 has been received from the virtual receiving unit. The message receiving window 622 may include at least part of the response data 620. Furthermore, the message receiving window 622 may include at least one of the representative name and image of the virtual receiving unit to distinguish it from messages received from other external terminals.

Furthermore, the controller 180 may control another output unit to output a voice signal, notification light or the like to notify the reception of the response data 620 to the user. It may be substantially same as a notification format for notifying a message received from the other external terminals.

In other words, the controller 180 may display the response data 620 after a predetermined period of time subsequent to entering the input data 610. For example, it may correspond to a case where a search function is required to generate response data based on the input data 610 or a case where an analysis time is required to provide more accurate information.

The controller 180 controls the display unit 151 to display the execution screen of an application including the response data 620 based on a touch input applied to the message receiving window 622.

Accordingly, the user may enter input data using a message application and receive the result in a substantially similar manner to that of receiving a message. As a result, the user may receive his or her desired information in the format of sending and receiving messages to and from another person.

A control method of connecting a call received from an external terminal using the virtual receiving unit will be described with reference to FIG. 6C.

Figure 6C:
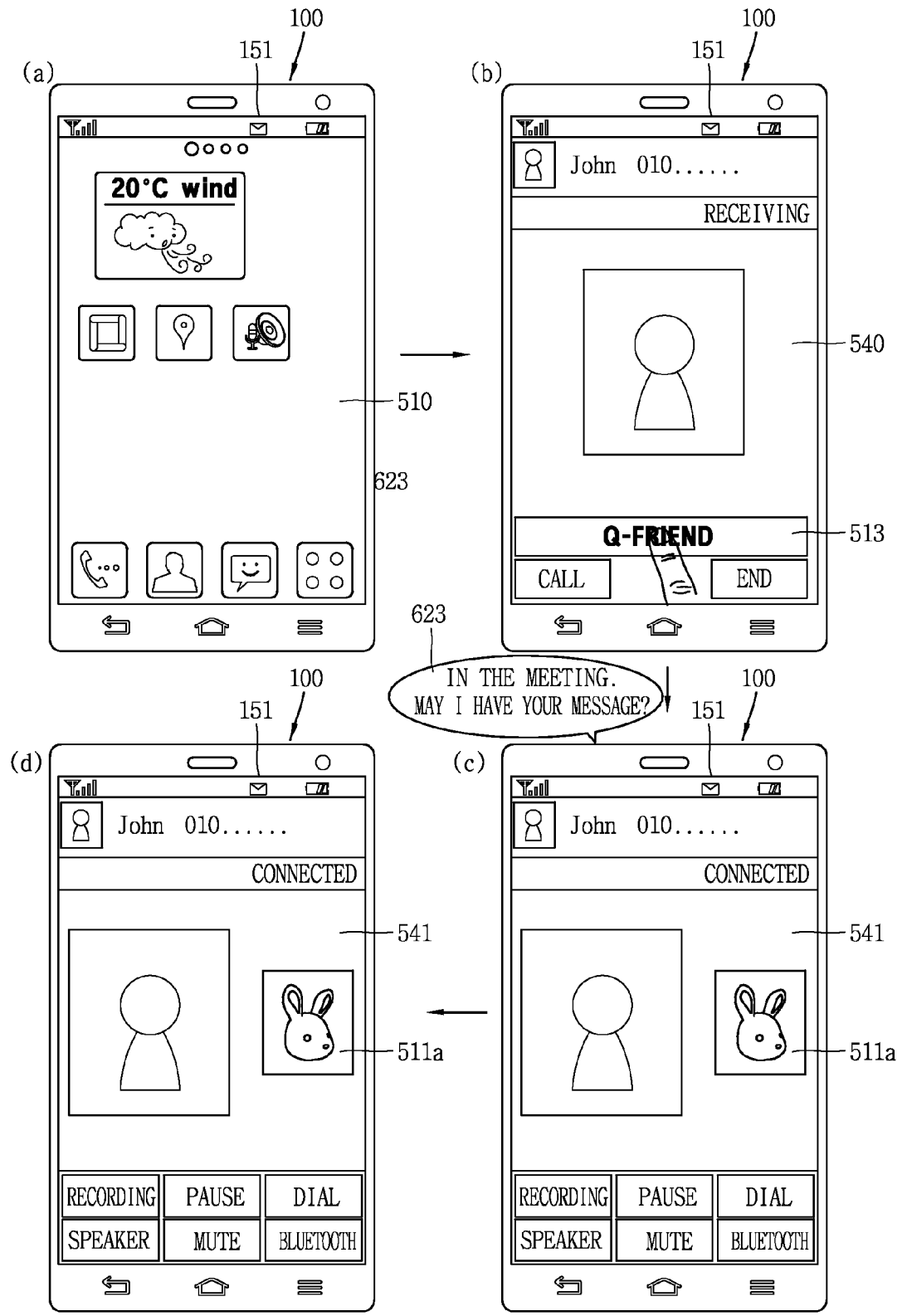

Referring to FIGS. 6C(a) and 6C(b), when a call is received from the external terminal, the controller 180 executes a call application, and controls the display unit 151 to display a receiving screen 540. The controller 180 controls the display unit 151 to display a call icon for connecting the call to the receiving screen 540, an end icon for restricting the connection of the call, and a graphic image 513 of the virtual receiving unit.

Referring to FIG. 6C(c), the controller 180 controls the wireless communication unit 110 to connect the call based on a touch input applied to the graphic image 513. Furthermore, the controller 180 controls the display unit 151 to activate a call mode and display a call screen 541.

Furthermore, the controller 180 controls the display unit 151 to display an image 511a of the virtual receiving unit on the call screen 541. However, it may not be necessarily limited to this, and a representative name of the virtual receiving unit may be also displayed. Accordingly, the user may know that the call has been connected by the virtual receiving unit.

Furthermore, the controller 180 may deactivate the microphone. Accordingly, a sound entered from the outside may not be transferred to the external terminal.

Furthermore, the call mode has been activated, and thus it is clear that the external terminal is recognized as a call state with the mobile terminal.

When the call mode is activated, the controller 180 controls the wireless communication unit to transmit predetermined voice data 623 to the external terminal. Furthermore, the controller 180 may control the speaker or receiver to output the voice data 623, but control the speaker or receiver to block the output of the voice data 623.

The voice data may be stored as response data 623 by means of the user's setting. For example, the response data 623 may include different information according to the user's setting. When a user is in a meeting, the response data 623 may include a voice signal for transferring the user's current status and receiving a message from the user of the external terminal.

Furthermore, the controller 180 may control the wireless communication unit 110 to receive a voice signal received from the user or the external terminal. Furthermore, the controller 180 may control the receiver and speaker to output the voice signal.

On the other hand, the controller 180 may allow a speaker phone mode to be activated from the call mode based on a touch input applied to the graphic image 513. However, a speaker phone mode according to the present embodiment may be a mode for blocking an external sound from being input to the mobile terminal and controlling a voice signal received from an external terminal to be output to the outside.

When the output of a voice signal received from the external terminal is restricted, the controller 180 may control the memory 160 to store the voice signal. The memory 160 may store the voice signal as a sound signal or convert and store it in a text format.

Hereinafter, a control method of providing a voice signal to the user will be described with reference to FIG. 6D.

Figure 6D:
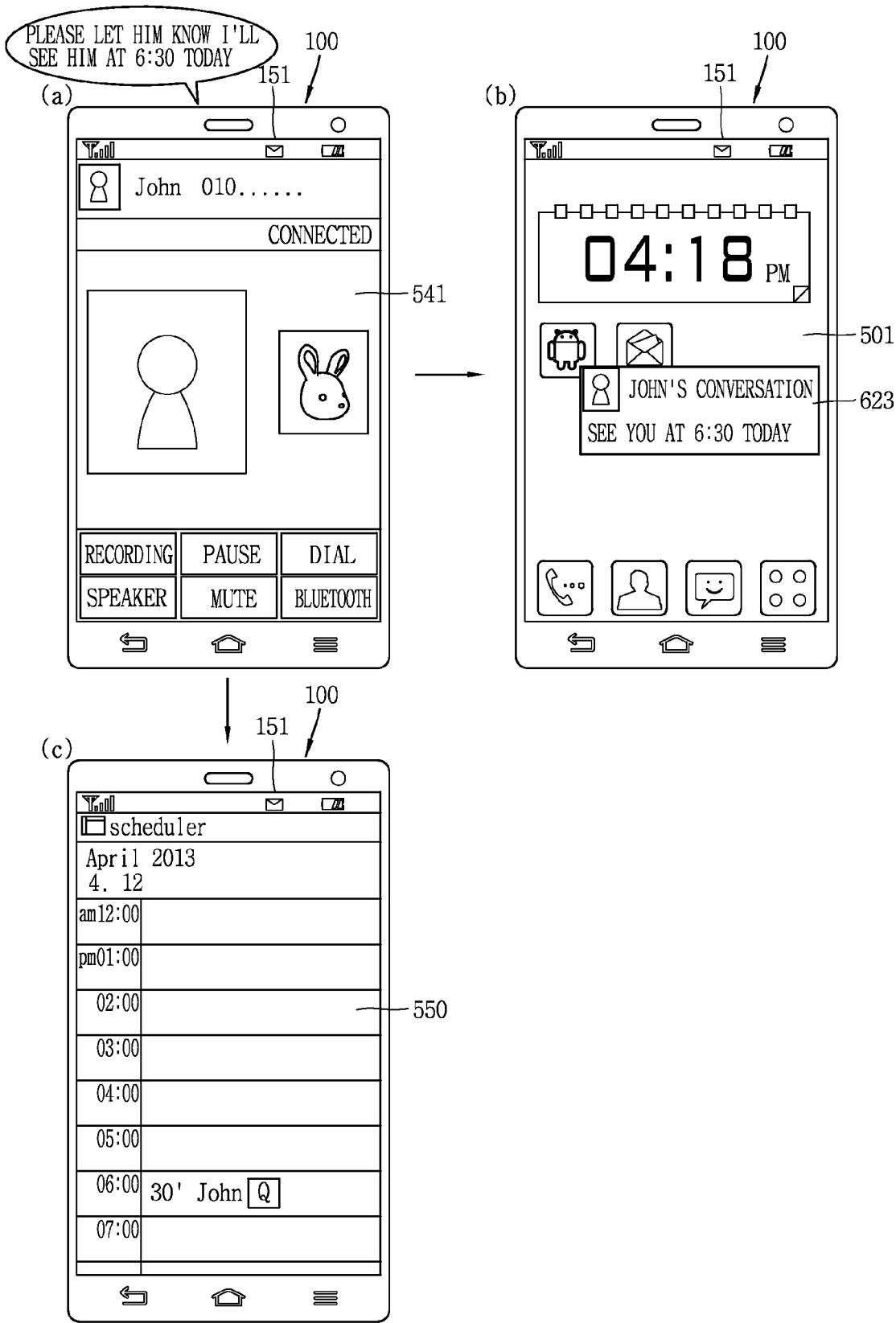

FIG. 6D(a) illustrates a case where a voice signal is received from the external terminal. For example, the controller 180 may control the memory to store the voice signal in a text format.

Referring to FIG. 6D(b), the controller 180 may control the display unit 151 to display text corresponding to the voice signal as response data. For example, the controller 180 controls the display unit 151 to display a message receiving window 622 containing at least part of response data stored in the memory 160. Furthermore, the controller 180 may control at least one output unit to notify information indicating that a message containing the rear surface has been received from the virtual receiving unit.

The controller 180 may generate the response data in a substantially similar manner to that of the voice signal converted text. However, it may not be necessarily limited to this, and the response data may be formed to include at least part of the text extracted based on a predetermined criteria or include a representative name of the external terminal.

In other words, the controller 180 may form response data in the message format with the input voice signal as input data.

On the other hand, referring to FIG. 6D(c), the controller 180 may activate an application associated with information contained in the voice signal based on the input voice signal.

For example, the controller 180 may execute a calendar application (or schedule application) using words, today, at 6:30, see you, and the like, contained in the voice signal, and control the display unit 151 to display the execution screen 550.

Furthermore, the controller 180 may control the display unit 151 to display information contained in the voice signal on the execution screen 550, and control the memory 160 to store the information in the storage space of the application.

Accordingly, the controller 180 may analyze the input data using a voice signal received at the virtual receiving unit from the external terminal to execute an application associated with the input data.

In other words, when the information of the external terminal instead of the user is input to the virtual receiving unit, the information may be stored through the information analysis or a function associated with the information may be automatically carried out.

Furthermore, even when the user cannot receive a call of the external terminal since the stored information is notified to the user in a message format, it may be possible to receive information from the external terminal without fail.

Figure 6E:
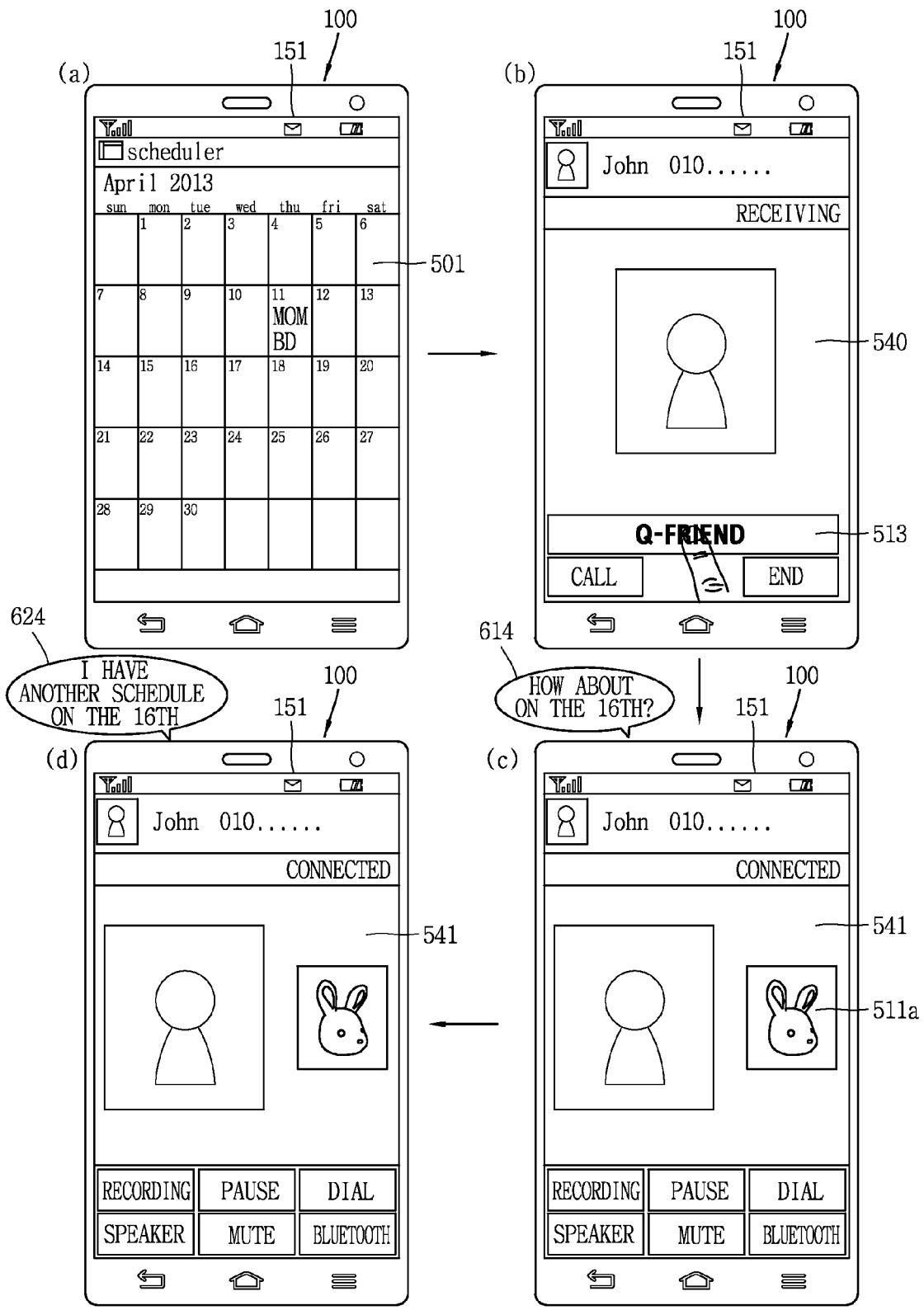

A control method of displaying information associated with input data that has been input to the virtual receiving unit among the information stored in the memory will be described with reference to FIG. 6E. FIG. 6E(a) illustrates the execution screen 501 of a calendar application. The execution screen 501 may include information (mom's birthday on the 11th day).

Referring to FIGS. 6E(b) and 6E(c), upon receiving the call, the controller 180 controls the display unit 151 to display a receiving screen 540. The controller 180 may connect the call to activate a call mode based on a touch input applied to a graphic image 513 contained in the receiving screen 540. A voice signal received from the external terminal in the call mode is received by the virtual receiving unit.

In other words, the virtual receiving unit receives the voice signal (Are you available on the 16th day?) as input data 614. The controller 180 generates response data 624 corresponding to the input data 614 using information stored in the storage space of the calendar application.

For example, the controller 180 retrieves and extracts information from the storage space of the calendar application by the 16th day contained in the input data 614. The controller 180 may retrieve information stored in the storage space of the calendar application to correspond to the 16th day. Accordingly, the controller 180 can generate response data 624 containing information indicating that he or she has another schedule on the 16th day.

The controller 180 may control the wireless communication unit 110 to transmit the response data 624 as a voice signal to the external terminal.

In other words, information associated with data received from the external terminal may be extracted from information stored in the memory without a user's control command to generate response data, and thus the suitable expression of his or her intention can be delivered to the external terminal in a difficult situation in which the user cannot respond.

Though not shown in the drawing, the controller 180 may control the display unit 151 to display a check window for asking whether or not to send response data generated by the retrieved and extracted information to the external terminal.

A control method of receiving response data containing a voice signal and visual information will be described with reference to FIG. 6F.

The controller 180 generates first response data 624 using input data entered using the call application. The controller 180 controls the receiver or speaker to output the response data 624.

On the other hand, when it is difficult to form information corresponding to the input data as a voice signal, the controller 180 may form it with a notification indicating that the first response data 624 will be sent in a different format.

The controller 180 generates second response data 625 having a different format from that of the first response data 624 according to the input data. The controller 180 controls the display unit 151 to display a message receiving window containing at least part of the second response data 625. In other words, the controller 180 may control the display unit 151 to display the second response data 625 using the message application.

For example, the second response data 625 may be formed in the form of an image, video or the like.

In other words, the controller 180 may transfer data to the user using a different application according to the format of the generated response data, and thus receive suitable data without being required to enter data to the virtual receiving unit using a different application.

Figure 7:
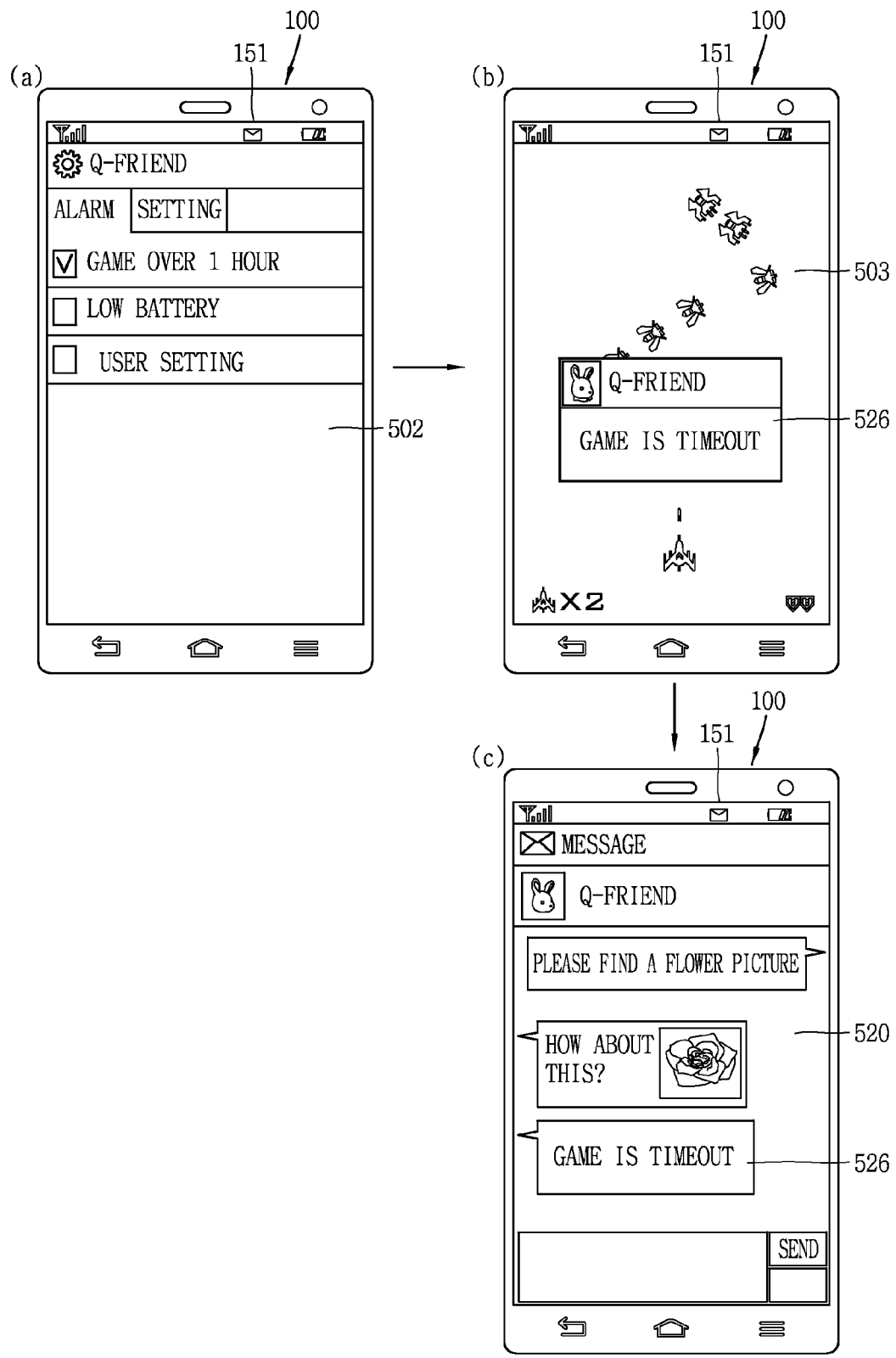
FIG. 7 is a conceptual view for explaining a control method of entering conditional input data to the virtual receiving unit.

FIG. 7 is a conceptual view for explaining a control method of entering conditional input data to the virtual receiving unit. FIG. 7A illustrates a setup screen 502 for entering conditional input data to the virtual receiving unit.

The setup screen 502 may include a setup input unit for displaying response data when the predetermined condition is satisfied. The setting containing the condition is stored in the virtual receiving unit as the input data. For example, the input data may correspond to an alarm in case where the user plays a game more than an hour. A condition corresponding to the alarm may be specified in advance or added by the user.

Referring to FIG. 7B, the controller 180 may control the display unit 151 to display a message receiving window containing at least par of the response data 526 at a time point where the execution of the game application is over one hour. For example, the controller 180 may control the display unit 151 to display the message receiving window to be overlapped on the execution screen 503 of the game application.

Furthermore, the controller 180 may control the response data 526 to be displayed while pausing the execution of the game application or deactivating the game application.

On the other hand, the controller 180 may execute the message application based on a touch input applied to a message receiving window containing the response data 526. The controller 180 controls the display unit 151 to display an execution screen 520 containing at least one message transmitted and received to and from the virtual receiving unit.

The execution screen 520 may include the response data 526 displayed for an alarm. In other words, the controller 180 may control the memory 160 to stored the response data 526 for the alarm to the storage space of the message application.

Accordingly, the user may receive alarm information in a message format. However, it may not be necessarily limited to this, and the alarm may be provided using a call application.

When the condition is satisfied by condition information set by the user, the controller 180 may control the display unit 151 to display a receiving screen containing a graphic image for connecting a call to information indicating that the call has been received from the virtual receiving unit. Furthermore, the controller 180 may control the speaker to output a notification sound according to the reception of the call.

Accordingly, the user should apply a control command for connecting the call or blocking the reception of the call, thereby recognizing a condition corresponding to the alarm.

Furthermore, when the call is connected, the controller 180 may control the receiver or speaker to output a voice signal containing information on a condition to the user.

Various control methods of entering input data to a virtual receiving unit will be described with reference to FIGS. 8A through 8D.

A control method of forming input data by means of a touch input applied to content displayed on the display unit 151 will be described with reference to FIG. 8A. 8A(a) illustrates the execution screen of a message application containing at least one content.

The controller 180 controls the display unit 151 to display an icon 504 for transferring the content to the virtual receiving unit based on a touch input applied to one content. The touch input may correspond to a long touch input applied for a predetermined period of time (several seconds).

The controller 180 forms content that has received the touch input as input data based on a control command applied to the icon 504. The controller 180 may control a predetermined function to be execute based on the input data.

Figure 8A:
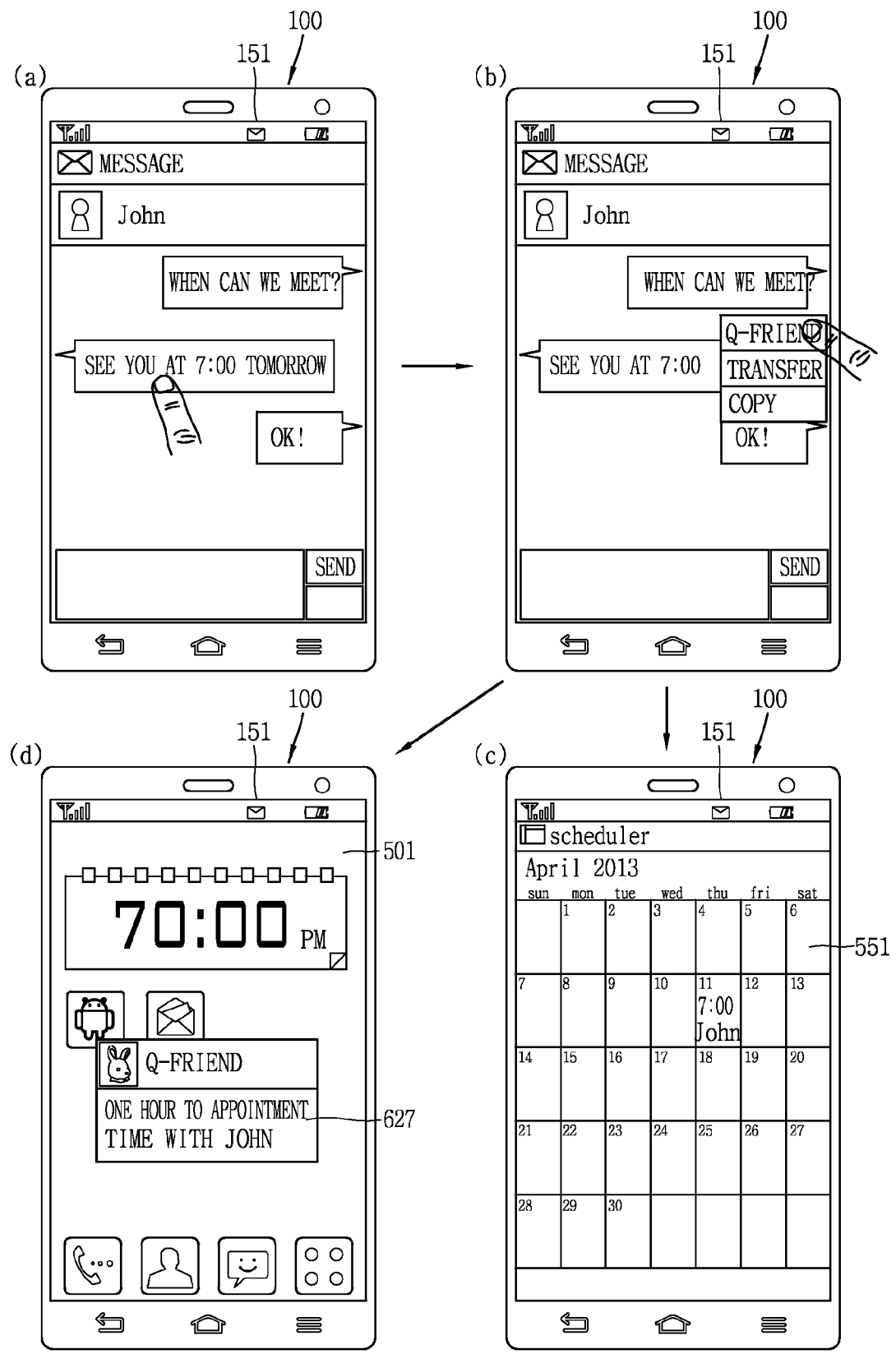
FIGS. 8A through 8D are conceptual views for explaining various control methods of entering input data to the virtual receiving unit.

Referring to FIGS. 8A(b) and 8A(c), the controller 180 may execute a calendar application based on the touch input. The controller 180 may analyze the input data to control response data associated with the input data to be input to the storage space of the application.

In other words, the controller 180 may generate the response data based on information on an external terminal that has transmitted the message, information contained in the message, and the current status of a mobile terminal. Here, the current status of the mobile terminal denotes information sensed when the mobile terminal is in an active state. For example, it may correspond to current time, current weather, current location of the mobile terminal, the measured remaining amount of the battery, and the like.

For example, the calendar application may include a storage space corresponding to each data, and the controller 180 controls the display unit 151 to display the execution screen 551 of the calendar application. The controller 180 may analyze the generated input data and control the response data to be input to a storage space corresponding the date extracted by the input data.

In other words, the virtual receiving unit displays response data generated by the input data on the execution screen of a specific application without a user's control command. Accordingly, the use may control the mobile terminal to store specific information without passing through a plurality of processes.

Referring to FIGS. 8A(b) and 8A(c), the controller 180 may control the display unit 151 to display the generated response data using the message application. In other words, the controller 180 controls the display unit 151 to display a message receiving window 627 containing the response data.

However, the controller 180 analyzes information contained in the input data, and controls the display unit 151 to display the response data at an appropriate time based on the current status of the mobile terminal.

For example, the controller 180 extracts time information contained in the input data to compare the time information with current time information, thereby displaying the response data. In other words, the controller 180 controls the display unit 151 to generate and display response data using the information of input data and current time.

Accordingly, the user may set up a conditional alarm using the virtual receiving unit in a more convenient manner.

A control method of transmitting the generated response data to an external terminal will be described with reference to FIG. 8B.

Figure 8B:
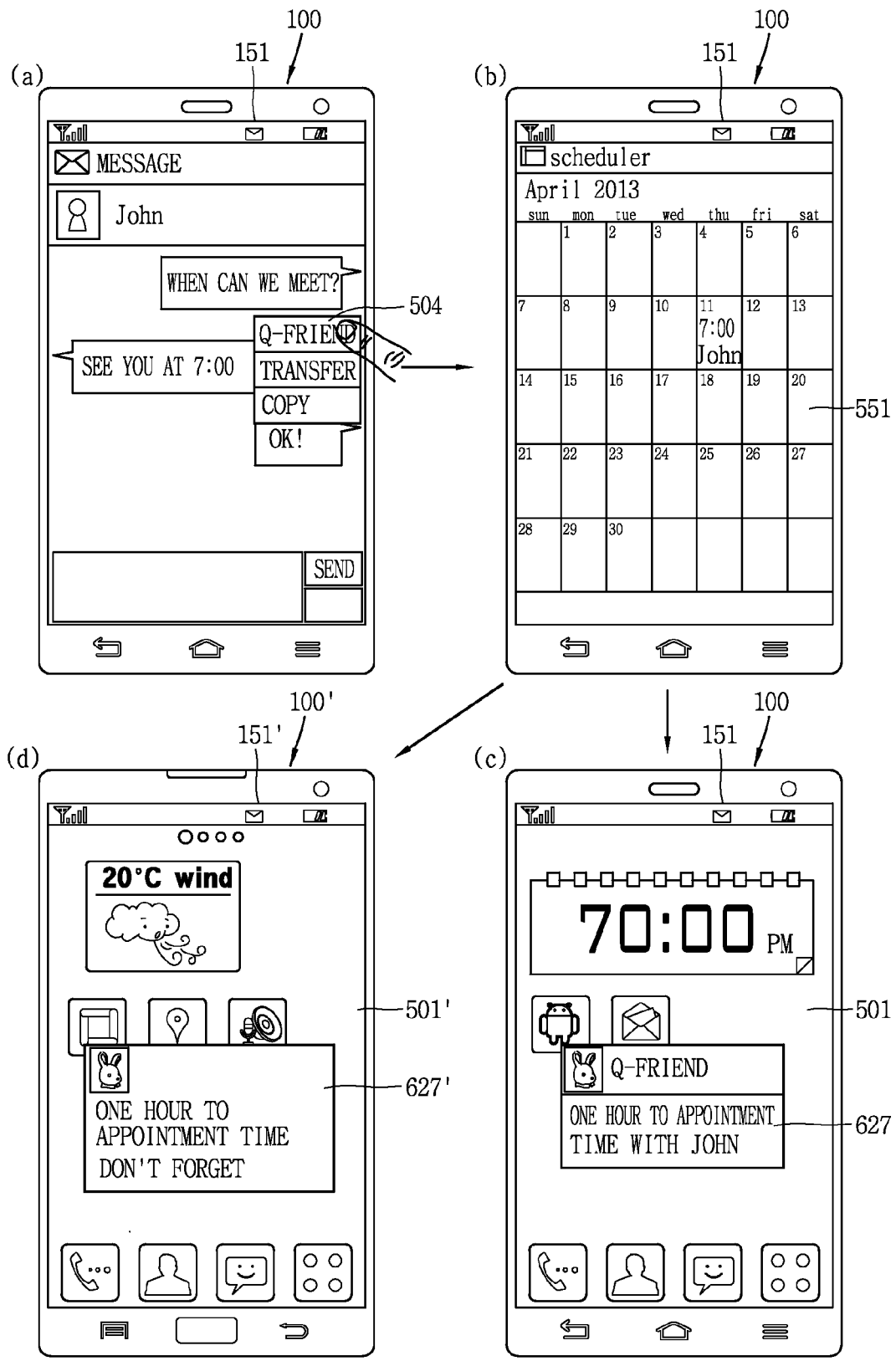

FIGS. 8B(a), 8B(b) and 8B(c) are conceptual views for explaining a control method of storing information contained in content in a storage space of the application based on a touch input applied to the content. It is substantially similar to that of the control method contained in FIG. 8A, and thus the redundant description thereof will be omitted.

Referring to FIG. 8B(d), the controller 180 generates response data using information stored in the storage space of the specific application and the current status of the mobile terminal. The controller 180 controls the wireless communication unit 110 to transmit the response data 627' to the external terminal 100'.

The controller 180 specifies an external terminal for transmission using other information stored in the memory, and generate the response data 627' based on data transmitted and received to and from the external terminal.

In other words, the controller 180 can transmit response data to an external terminal associated with the input data as well as a mobile terminal.

A control method of executing a different function for information contained in input data will be described with reference to FIG. 8C. Referring to FIGS. 8A(a), 8A(b) and 8A(c), the controller 180 executes a message application based on a touch input applied to the icon 540. In other words, the controller 180 can execute an application for transmitting other input data to the virtual receiving unit to make a reservation for restaurant "A". Though not shown in the drawing, the controller 180 may execute a call application for transmitting other input data made of a voice signal to make a reservation for the restaurant "A".

Furthermore, the controller 180 controls the display unit 151 to display the execution screen 520 containing an input window for transmitting input data to the virtual receiving unit.

The controller 180 output response data corresponding to at least one input data that is input to the execution screen 520. The input data and response data may correspond to information required for the restaurant "A".

Figure 8C:
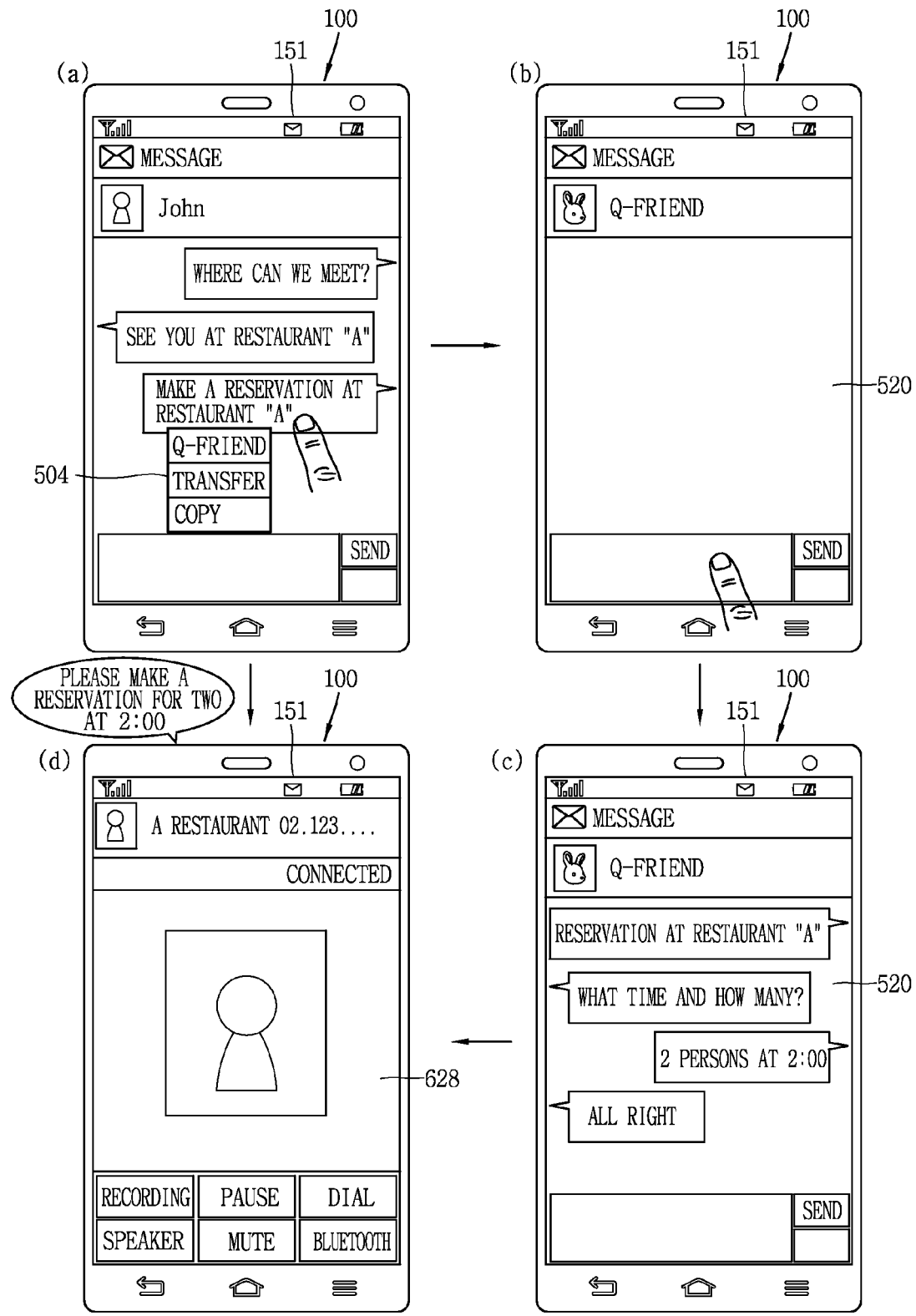

Referring to FIG. 8C(d), the controller 180 executes a call application for making a call to an external terminal corresponding to the restaurant "A". When a call mode in which a call is connected to the external terminal is activated, the controller 180 generates response data. For example, the response data may be formed based on information required for the reservation of restaurant "A" displayed on the execution screen of a message application.

Furthermore, the controller 180 controls the wireless communication unit 110 to transmit the response data to the external terminal.

On the other hand, referring to FIGS. 8C(a) and 8C(d), the controller 180 may immediately execute the calendar application based on a touch input applied to the icon 504, and generate the response data using the content.

Accordingly, the user may execute a function associated with content in a more convenient manner.

A control method of implementing response data according to the alarm setting with the execution of a calendar application and voice signal will be described with reference to FIG. 8D.

Figure 8D:
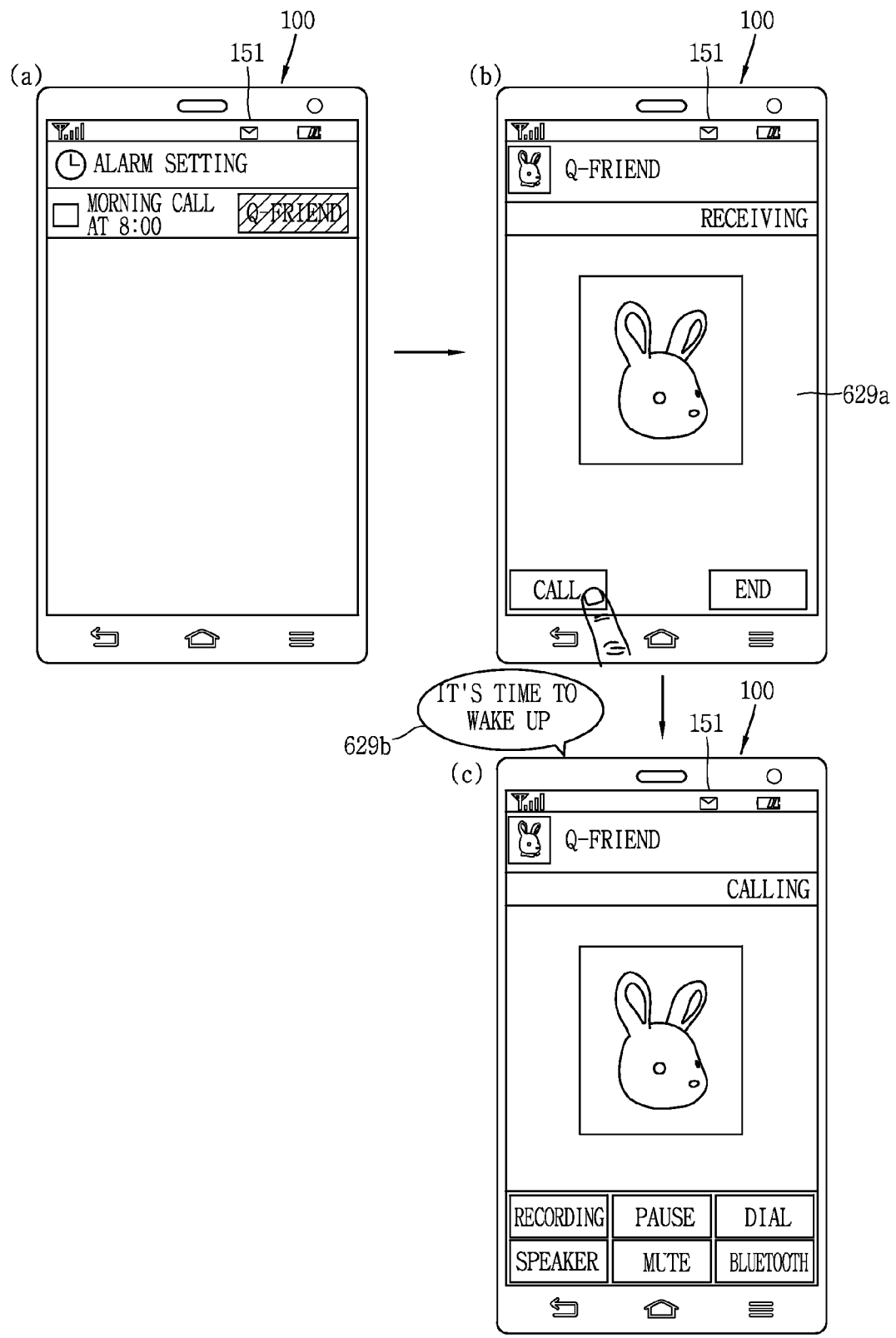

Referring to FIG. 8D(a), an icon for storing information on an alarm in the virtual receiving unit may be displayed on the execution screen for setting up an alarm.

Referring to FIGS. 8D(b) and 8D(c), the controller 180 executes the calendar application by the alarm condition. When a call is connected based on a touch input applied to the display unit 151, the controller 180 may control the receiver or speaker to output information on an alarm as a voice signal.

Figure 9A:
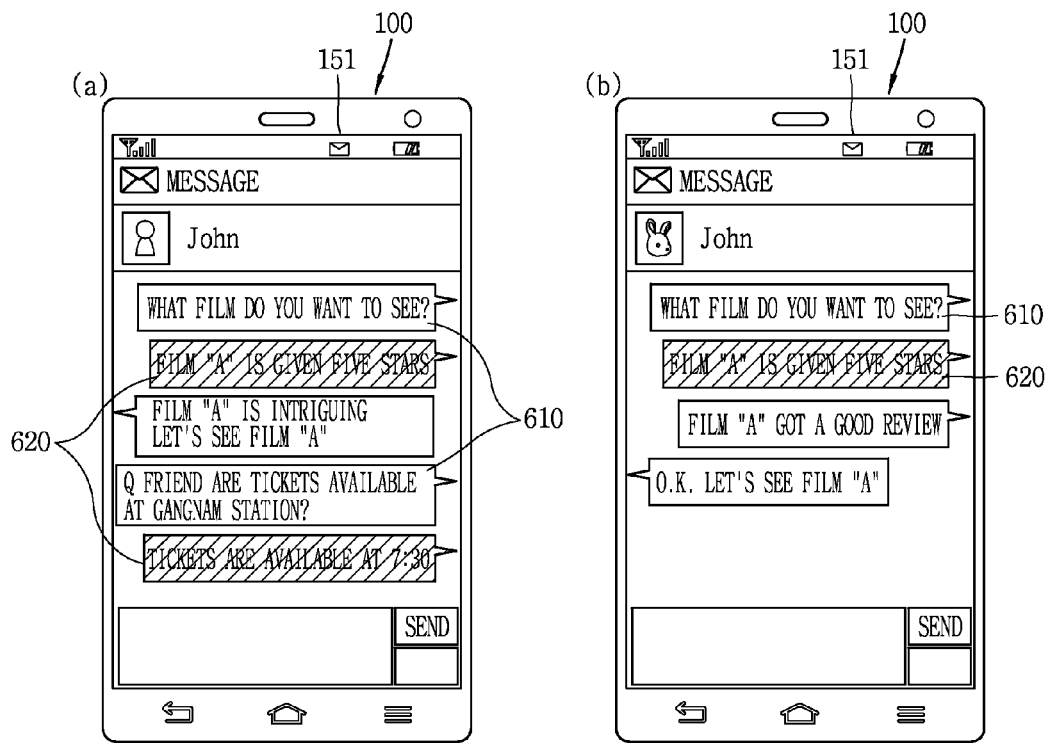
FIGS. 9A and 9B are conceptual views for explaining a control method of outputting response data from the virtual receiving unit when transmitting and receiving a message to and from an external terminal.
Figure 9B:
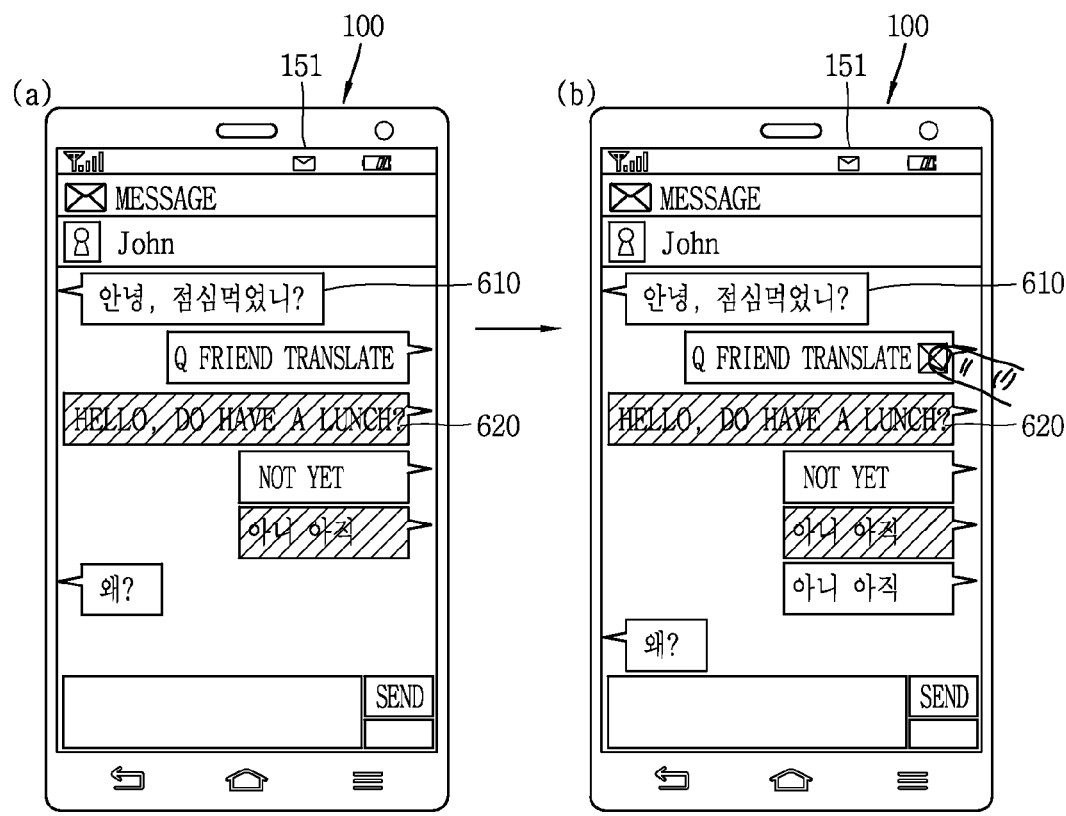

FIGS. 9A and 9B are conceptual views for explaining a control method of outputting response data from the virtual receiving unit when transmitting and receiving a message to and from an external terminal.

A control method of displaying response data generated using a message transmitted to an external terminal as input data when transmitting and receiving a message to and from the external terminal will be described with reference to FIG. 9A.

Referring to FIG. 9A(a), the controller 180 generates response data 620 using a message 610 transmitted to the external terminal as input data. The controller 180 controls the display unit 151 to display the response data 620, and controls the wireless communication unit 110 to transmit the response data 620 to the external terminal.

Accordingly, the user of the external terminal may recognize the response data, thereby sending a response to this.

On the other hand, referring to FIG. 9A(b), the controller 180 controls the display unit 151 to display the response data 620 contained in the graphic image. However, the transmission of the response data 620 to the external terminal is blocked. Accordingly, the user of the external terminal cannot receive the response data.

It may be controlled by the user's setting.

A control method of generating response data for input data with a different language will be described with reference to FIG. 9B.

Referring to FIG. 9B(a), the controller 180 uses a message received from an external terminal or transmitted to the external terminal as input data to translate and generate information contained in the message into a first language and a second language. For example, when a message with a first language is received from the external terminal, the controller 180 controls the display unit 151 to translate the message based on a touch input applied to a graphic image (Q-FRIEND translation) displayed on the display unit 151 and display response data 620.

The controller 180 controls the display unit 151 to translate and display all messages received and transmitted, and controls the wireless communication unit 110 to transmit them all to the external terminal.

On the other hand, referring to FIG. 9B(b), the graphic image may include an icon 610' receiving a touch input for controlling the wireless communication unit 110 to limit the transmission of the response data 620.

In other words, the controller 180 may display the response data 620 on the display unit 151, and block the transmission of the response data 620 to the external terminal based on a touch input applied to the icon 610' contained in the graphic image.

In other words, the user may control the transmission of a response message subject to translation to the external terminal.

Figure 10:
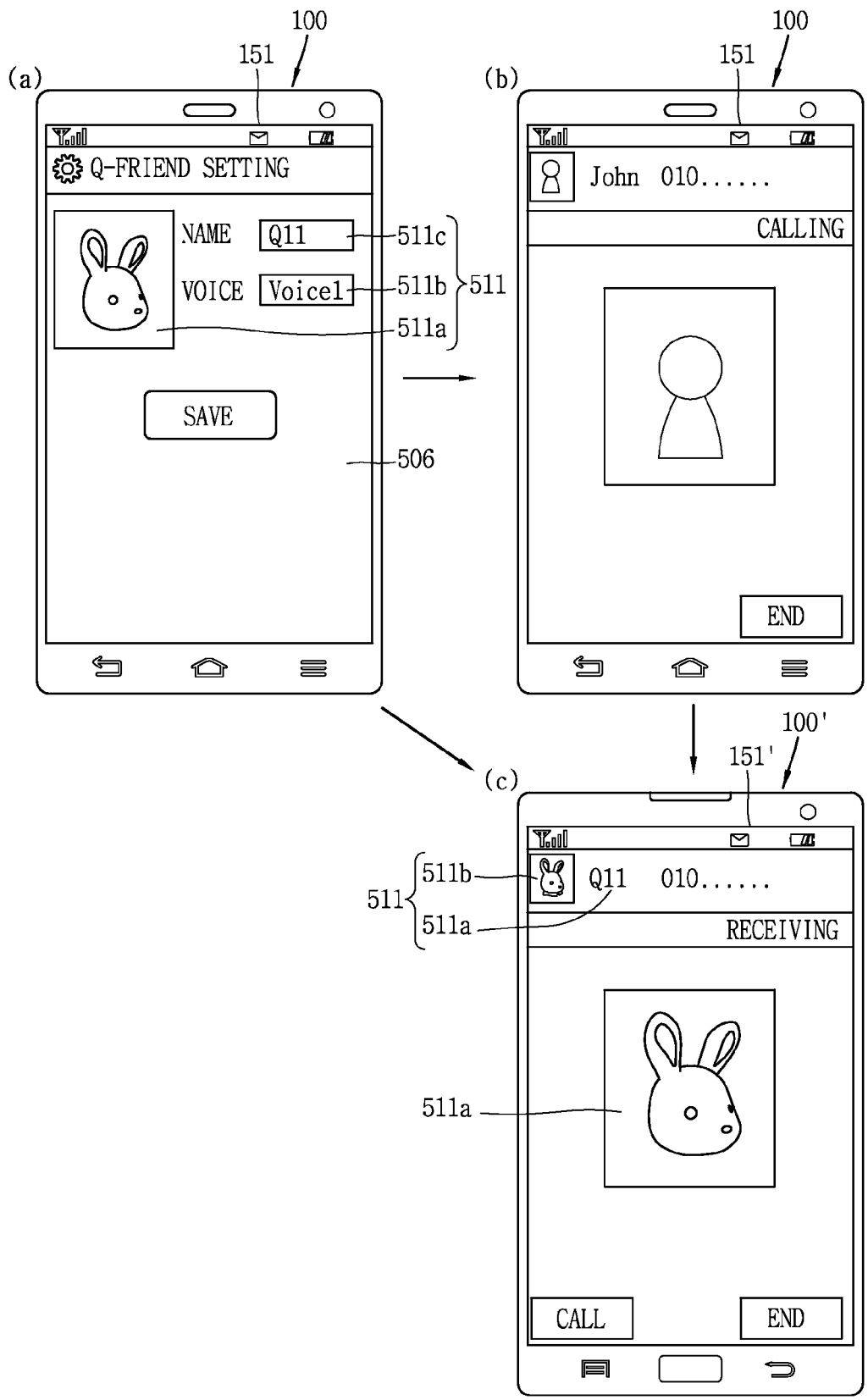
FIG. 10 is a conceptual view for explaining a control method of setting up the information of the virtual receiving unit and transmitting it to an external terminal.

FIG. 10 is a conceptual view for explaining a control method of setting up the information of the virtual receiving unit and transmitting it to an external terminal.

FIG. 10A illustrates an execution screen 506 for setting up the information 511 of the virtual receiving unit. The user may enter a representative image 511a, a representative voice 511b and a representative name 511c that represent the virtual receiving unit.

Referring to FIGS. 10B and 100, the controller 180 controls the wireless communication unit 110 to transmit information 511 on the virtual receiving unit while at the same time making a call to the external terminal.

Accordingly, the external terminal may receive the information 511, and output the information 511 when there is no information corresponding to the mobile terminal.

In other words, when unique information on a mobile terminal is not specified in an external terminal, information corresponding to the virtual receiving unit may be output.

The configurations and methods according to the above-described embodiments will not be applicable in a limited way to the foregoing terminal and a terminal mounted with a cover, and all or part of each embodiment may be selectively combined and configured to make various modifications thereto.

What is claimed is:

1. A mobile terminal, comprising:
a virtual receiving unit;
a display unit to display a graphic image for receiving a control command for transmitting input data to the virtual receiving unit;
a memory to store at least one first information associated with the virtual receiving unit and second information corresponding to an identification number of the mobile terminal for wireless communication with an external terminal;
a user input unit to be activated to receive input data based on a control command; and
a controller to:
control the virtual receiving unit to generate response data associated with the input data,
control the display unit to display information on the virtual receiving unit along with information corresponding to at least one external terminal stored in the memory, and
control the second information to be sent when the identification number is stored in the external terminal.

2. The mobile terminal of claim 1, wherein the graphic image is displayed along with the first information of the virtual receiving unit, and
the controller controls the display unit to display the execution screen of a message application performing the function of sending and receiving content based on the control command, and display the input data and the response data on the execution screen.

3. The mobile terminal of claim 2, wherein when the memory comprises a storage space of the message application, and
the controller controls the memory to store the input data and the response data in the storage space.

4. The mobile terminal of claim 2, wherein the controller activates the message application when response data generated by a user's setting is output from the virtual receiving unit, and controls the display unit to display an alarm screen notifying the reception of a message containing the response data.

5. The mobile terminal of claim 1, wherein the user input unit further comprises:
a microphone configured to be activated by the control command to receive a user's voice; and
a speaker formed to output the response data as a voice signal.

6. The mobile terminal of claim 5, wherein the controller activates a call application for transmitting and receiving a voice signal to and from the virtual receiving unit based on the control command.

7. The mobile terminal of claim 5, wherein the controller activates the call application when response data is output from the virtual receiving unit based on the user's setting, and controls the display unit to display screen information notifying the reception of the call.

8. The mobile terminal of claim 1, wherein the controller controls the display unit to display screen information notifying the reception of a call and the graphic image at the same time when the call is received from an external terminal, and
the controller activates a call mode for the call and transmits the response data to the external terminal based on the control command.

9. The mobile terminal of claim 8, further comprising
a memory configured to store information entered by the user,
wherein the controller uses a voice signal received from the external terminal as input data in the call mode to generate the response data based on the information.

10. The mobile terminal of claim 9, wherein the controller controls the memory to store the input data and the response data, and
the controller controls the display unit to display the stored input data and response data in a text format when the call mode is terminated.

11. The mobile terminal of claim 1, wherein the controller further comprises an analysis unit configured to analyze a voice signal received from the external terminal when a call mode is activated, and
the controller controls the display unit to display information on the analyzed voice signal.

12. The mobile terminal of claim 1, wherein the controller displays the execution screen of a message application performing the function of sending and receiving content to and from an external terminal and the graphic image at the same time, and controls the virtual receiving unit to receive the content as the input data based on the control command.

13. The mobile terminal of claim 12, wherein the response data corresponds to text interpreted from the input data to a different language.

14. The mobile terminal of claim 12, wherein the controller controls the response data to be sent to the external terminal.

15. The mobile terminal of claim 13, wherein the controller controls the display unit to display an icon receiving a touch input for blocking the transmission of the response data.

16. The mobile terminal of claim 1, wherein the graphic image is displayed based on a touch input applied to at least one content displayed on the display unit, and
the controller controls the virtual receiving unit to receive the content as the input data based on the control command.

17. The mobile terminal of claim 16, wherein the controller activates an application corresponding to the content based on the response data.

18. A control method of a mobile terminal, the method comprising:
storing at least one first information associated with a virtual receiving unit and second information corresponding to an identification number of the mobile terminal for wireless communication with an external terminal;
activating a user input unit for entering input data;
generating response data regarding the input data;
activating an output unit for outputting the response data; and
sending the second information when the identification number is stored in the external terminal,
wherein the output unit corresponds to at least one of a display unit for displaying visual data, a speaker for outputting a voice signal, and a wireless communication unit for transmitting the response data to an external terminal.

19. The method of claim 18, further comprising:
displaying a graphic image receiving a control command for activating the user input unit on the display unit,
wherein the graphic image is displayed along with information on the external terminals stored by a user and the information on the virtual receiving unit receiving the input data.

20. A mobile terminal, comprising:
a virtual receiving unit;
a display unit to display a graphic image for receiving a control command for transmitting input data to the virtual receiving unit;
a memory to store at least one information associated with the virtual receiving unit;
a user input unit to be activated to receive input data based on a control command; and
a controller to:
control the virtual receiving unit to generate response data associated with the input data,
control the display unit to display information on the virtual receiving unit along with information corresponding to at least one external terminal stored in the memory,
control the display unit to display screen information notifying the reception of a call and the graphic image at the same time when the call is received from an external terminal, and
activate a call mode for the call and transmits the response data to the external terminal based on the control command.

* * * * *